(12) United States Patent
Margolis et al.

(10) Patent No.: US 11,574,389 B2
(45) Date of Patent: Feb. 7, 2023

(54) REPROJECTION AND WOBULATION AT HEAD-MOUNTED DISPLAY DEVICE

(71) Applicant: Microsoft Technology Licensing, LLC, Redmond, WA (US)

(72) Inventors: Jeffrey Neil Margolis, Seattle, WA (US); Bernard Charles Kress, Redwood City, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/650,439

(22) Filed: Feb. 9, 2022

(65) Prior Publication Data

US 2022/0270217 A1    Aug. 25, 2022

Related U.S. Application Data

(63) Continuation of application No. 16/883,674, filed on May 26, 2020, now Pat. No. 11,263,729.

(51) Int. Cl.
*G06T 5/00* (2006.01)
*H04N 13/324* (2018.01)
*H04N 13/344* (2018.01)

(52) U.S. Cl.
CPC ........... *G06T 5/006* (2013.01); *H04N 13/324* (2018.05); *H04N 13/344* (2018.05)

(58) Field of Classification Search
None
See application file for complete search history.

(56) References Cited

U.S. PATENT DOCUMENTS

| | | | |
|---|---|---|---|
| 6,831,948 B1* | 12/2004 | Van Dijk | H04N 19/577 348/E9.042 |
| 10,944,960 B2* | 3/2021 | Matsunobu | H04N 13/194 |
| 11,263,729 B2* | 3/2022 | Margolis | H04N 13/344 |
| 11,288,842 B2* | 3/2022 | Lee | G06T 7/80 |
| 2013/0300948 A1* | 11/2013 | Jannard | H04N 9/3164 348/756 |
| 2014/0078260 A1* | 3/2014 | Taubin | G06T 7/80 348/46 |
| 2015/0029218 A1* | 1/2015 | Williams | G06T 15/205 345/633 |
| 2018/0199039 A1* | 7/2018 | Trepte | G06T 19/006 |
| 2019/0066323 A1* | 2/2019 | Li | G06T 7/70 |

(Continued)

*Primary Examiner* — James A Thompson
(74) *Attorney, Agent, or Firm* — Alleman Hall Creasman & Tuttle LLP

(57) ABSTRACT

A head-mounted display device including one or more position sensors and a processor. The processor may receive a rendered image of a current frame. The processor may receive position data from the one or more position sensors and determine an updated device pose based on the position data. The processor may apply a first spatial correction to color information in pixels of the rendered image at least in part by reprojecting the rendered image based on the updated device pose. The head-mounted display device may further include a display configured to apply a second spatial correction to the color information in the pixels of the rendered image at least in part by applying wobulation to the reprojected rendered image to thereby generate a sequence of wobulated pixel subframes for the current frame. The display may display the current frame by displaying the sequence of wobulated pixel subframes.

20 Claims, 18 Drawing Sheets

(56) References Cited

U.S. PATENT DOCUMENTS

| | | | | |
|---|---|---|---|---|
| 2020/0077070 A1* | 3/2020 | Takahashi | ...... | H04N 21/234345 |
| 2020/0098164 A1* | 3/2020 | Bruns | ...... | G06T 15/10 |
| 2020/0169725 A1* | 5/2020 | Hua | ...... | G02B 27/0101 |
| 2020/0334795 A1* | 10/2020 | Wu | ...... | G06T 7/74 |
| 2020/0342582 A1* | 10/2020 | Morino | ...... | G06T 3/00 |
| 2021/0035307 A1* | 2/2021 | Shih | ...... | G06V 40/165 |
| 2021/0349308 A1* | 11/2021 | Fan | ...... | G02B 27/0093 |
| 2022/0311990 A1* | 9/2022 | Makinen | ...... | H04N 13/322 |

\* cited by examiner

REPROJECTION AND WOBULATION AT HEAD-MOUNTED DISPLAY DEVICE

CROSS REFERENCE TO RELATED APPLICATIONS

This application is a continuation of U.S. patent application Ser. No. 16/883,674, filed May 26, 2020, the entirety of which is hereby incorporated herein by reference for all purposes.

BACKGROUND

Mixed-reality and full virtual reality head mounted devices typically include a pair of near eye displays located near each eye of the user. Full virtual reality devices include non-transparent near-eye displays, while mixed-reality devices include near-eye displays that are at least partially transparent. When a user uses a mixed-reality device, images are projected to the user's eyes via the near-eye display such that the images appear to be located in the user's physical three dimensional environment, and images of the physical environment are visible through the displays, when not occluded by displayed images. For full virtual reality displays, images appear projected into a fully virtual three-dimensional environment, which visually replaces the user's physical environment. Mixed reality and full virtual reality devices often take the form of glasses or goggles that the user wears. For mixed reality devices, while moving through a physical environment, and the device can display images such that those images appear to have world-locked locations.

SUMMARY

According to one aspect of the present disclosure, a head-mounted display device is provided, including one or more position sensors and a processor. The processor may be configured to receive a rendered image of a current frame that has been rendered at a remote computing device. The processor may be further configured to receive position data from the one or more position sensors. The processor may be further configured to determine an updated device pose of the head-mounted display device based on the position data. The processor may be further configured to apply a first spatial correction to color information in pixels of the rendered image at least in part by reprojecting the rendered image based on the updated device pose. The head-mounted display device may further include a display configured to apply a second spatial correction to the color information in the pixels of the rendered image at least in part by applying wobulation to the reprojected rendered image to thereby generate a sequence of wobulated pixel subframes for the current frame. The display may be further configured to display the current frame by displaying the sequence of wobulated pixel subframes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In existing mixed-reality and full virtual reality devices, the projectors that are used to display images to the user may be relatively large. The size of such projectors may make the projectors difficult to fit within a glasses form factor that is comfortable for the user to wear. In addition, the projectors used in existing mixed-reality devices may weigh more than would be desirable. Heavy projectors may make a mixed-reality device uncomfortable for the user to wear for extended periods of time.

The projectors included in existing mixed-reality devices may also have high rates of power consumption. The high power consumption rates of existing projectors may reduce battery life and may require users to charge the mixed-reality devices more frequently. In addition, if battery size is increased to account for the power requirements of the projectors, the size and weight of the mixed-reality devices may be further increased.

Figure 1:
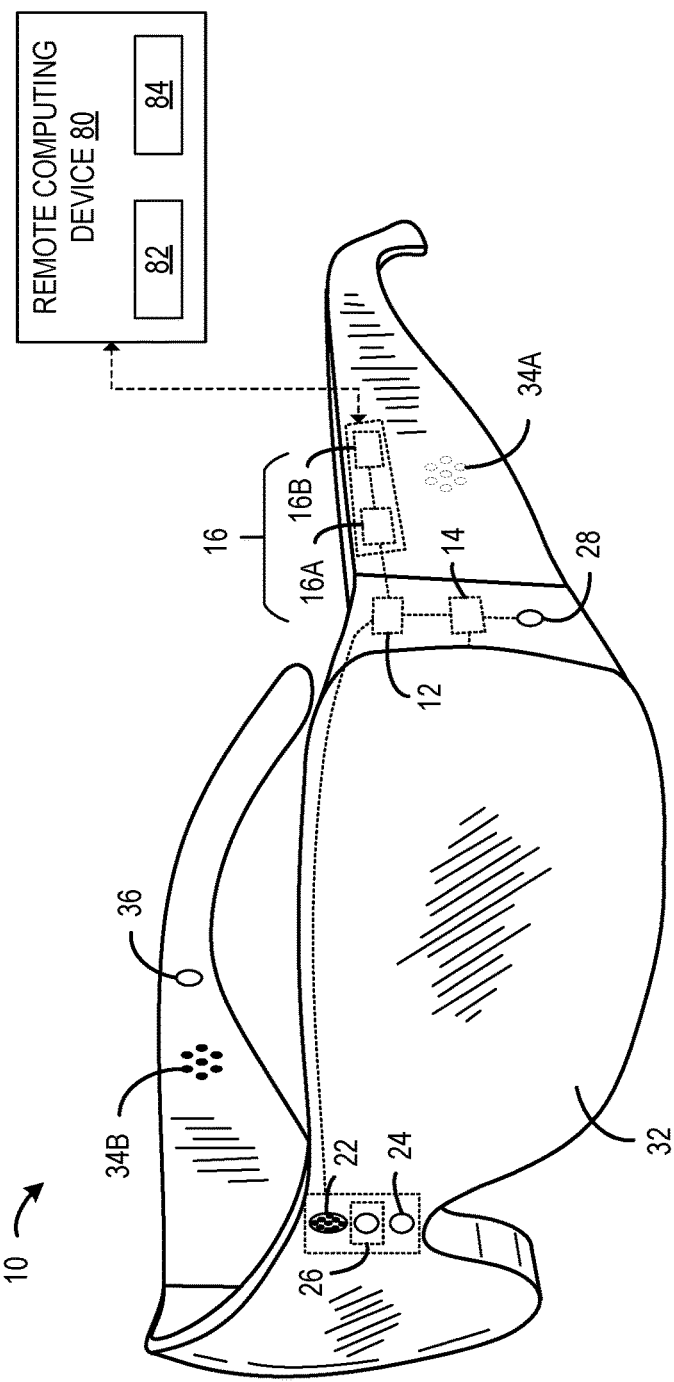
FIG. 1 shows a head-mounted display device, according to one embodiment of the present disclosure.

In order to address the limitations of existing mixed-reality devices, a head-mounted display device 10 is shown in FIG. 1, according to one example embodiment. The head-mounted display device 10 of FIG. 1 has the form of wearable glasses or goggles, but it will be appreciated that other forms are possible. The head-mounted display device 10 may include an output device suite including a display 32. For example, the display 32 may be a liquid crystal on silicon (LCoS) display.

The head-mounted display device 10 may be configured in an augmented reality configuration to present an augmented reality environment, and thus the display 32 may be an at least partially see-through stereoscopic display configured to visually augment an appearance of a physical environment being viewed by the user through the display 32. In some examples, the display 32 may include one or more regions that are transparent (e.g. optically clear) and may include one or more regions that are opaque or semi-transparent. In other examples, the display 32 may be transparent (e.g. optically clear) across an entire usable display surface of the display 32. Alternatively, the head-mounted display device 10 may be configured in a full virtual reality configuration in which the display 32 is opaque. In the full virtual reality configuration, a virtual environment may be displayed on the display 32.

The head-mounted display device 10 may include a processor 12 and memory 14. In some embodiments, some functions of the processor 12 and/or the memory 14 of the head-mounted display device 10 may be performed one or more remote computing devices 80 with which the head-mounted display device 10 is configured to communicate. As shown in FIG. 1, the remote computing device 80 includes a processor 82 and memory 84. The remote computing device 80 may, for example, be a server computing device located in a data center.

The head-mounted display device 10 may include a communication device suite 16 including one or more communication devices, which may include one or more receivers 16A and/or one or more transmitters 16B. In embodiments in which the head-mounted display device 10 communicates with a remote computing device 80, the one or more receivers 16A may be configured to receive data from the remote computing device 80, and the one or more transmitters 16B may be configured to send data to the remote computing device 80. In some embodiments, the head-mounted display device 10 may communicate with the remote computing device 80 via a network, which may be a wireless local- or wide-area network.

The processor 12 may be configured to output for display on the display 32 a mixed reality experience including one or more virtual objects superimposed upon the physical environment. In the augmented reality configuration with an at least partially see-through display, the virtual objects are visually superimposed onto the physical environment that is visible through the display 32 so as to be perceived at various depths and locations. The head-mounted display device 10 may use stereoscopy to visually place a virtual object at a desired depth by displaying separate images of the virtual object to both of the user's eyes such that the user will perceive that the virtual objects exist at a desired depth and location. When the head-mounted display device 10 is in the augmented reality configuration, the processor 12 may be configured to convey instructions to the display 32 to display a virtual object at a world-locked location in the physical environment. The location of the virtual object may be world-locked by maintaining an apparent position of the virtual object in the physical environment that is substantially conserved under changes in the user's viewing distance and perspective. The virtual object may be displayed over one or more frames that are displayed at a predetermined frequency in time, such as 60 Hz or 120 Hz.

Alternatively, the head-mounted display device 100 may be configured in a virtual reality configuration to present a full virtual reality environment, and thus the display 32 may be a non-see-though stereoscopic display. The head-mounted display device 10 may be configured to display virtual three-dimensional environments to the user via the non-see-through stereoscopic display. In some embodiments, the head-mounted display device 10 may be configured to display a virtual representation such as a three-dimensional graphical rendering of the physical environment in front of the user that may include additional virtual objects.

The head-mounted display device 10 may further include one or more speakers configured to emit sound. In some embodiments, the head-mounted display device 10 may include at least a left speaker 34A and a right speaker 34B situated such that the left speaker 34A may be located proximate the user's left ear and the right speaker 34B may be located proximate the user's right ear when the head-mounted display device 10 is worn. Thus, the left speaker 34A and the right speaker 34B may emit stereo sound output. The head-mounted display device 10 may further include one or more haptic feedback devices 36 configured to provide tactile output (e.g., vibration).

The head-mounted display device 10 may further include one or more input devices, which may include one or more optical sensors. In one example, the head-mounted display device 10 may include an outward-facing optical sensor 22 that may be configured to detect the real-world background from a similar vantage point (e.g., line of sight) as observed by the user through the display 32 in an augmented reality configuration. The head-mounted display device 10 may additionally include an inward-facing optical sensor 24 that may be configured to detect a gaze direction of the user's eyes. It will be appreciated that the outward-facing optical sensor 22 and the inward-facing optical sensor 24 may each include one or more component sensors such as a visible light camera or a depth camera. In some embodiments, depth data captured by the depth camera may be combined with color information captured by the visible light camera into a single image representation including both color data and depth data.

The head-mounted display device 10 may further include a position sensor system that may include one or more position sensors 26 such as accelerometer(s), gyroscope(s), magnetometer(s), global positioning system(s), multilateration tracker(s), inertial motion units (IMUs) and/or other sensors that output position data as a position, orientation, and/or movement of the relevant sensor. The head-mounted display device 10 may further include one or more microphones 28 configured to collect sound data.

Optical sensor information received from the one or more optical sensors and/or position data received from position sensors 26 may be used to assess a position and orientation of the vantage point of head-mounted display device 10 relative to other environmental objects. For example, the position and orientation of the vantage point may be determined using simultaneous localization and mapping (SLAM). In some embodiments, the position and orientation of the vantage point may be characterized with six degrees of freedom (6DOF) (e.g., world-space X, Y, Z, pitch, roll, yaw). This vantage point may be referred to as a device pose or device pose vector, and in some cases as a camera pose vector when referring to the server-side rendering of content to be displayed from the same vantage point. The position and/or orientation may be determined by the processor 12 of the head-mounted display device 10 and/or the remote computing device 80.

Furthermore, the optical sensor information and the position sensor information may be used by the processor 12 to perform analysis of the physical environment, such as depth analysis, surface reconstruction, environmental color and lighting analysis, or other suitable operations. In particular, the optical and positional sensor information may be used to create a virtual model of the physical environment. The virtual model may be used to determine respective world-locked locations of virtual objects in the virtual space and add additional virtual objects to be displayed to the user at a desired depth and location. In some embodiments, the physical environment may be modeled over a plurality of frames. In such embodiments, each frame may have associated optical and/or positional sensor information. The optical sensors may also be used to identify machine recognizable visual features in the physical environment and use the relative movement of those features in successive frames to compute a frame-to-frame relative pose change for the head-mounted display device 10 within the world space of the virtual model.

Figure 2:
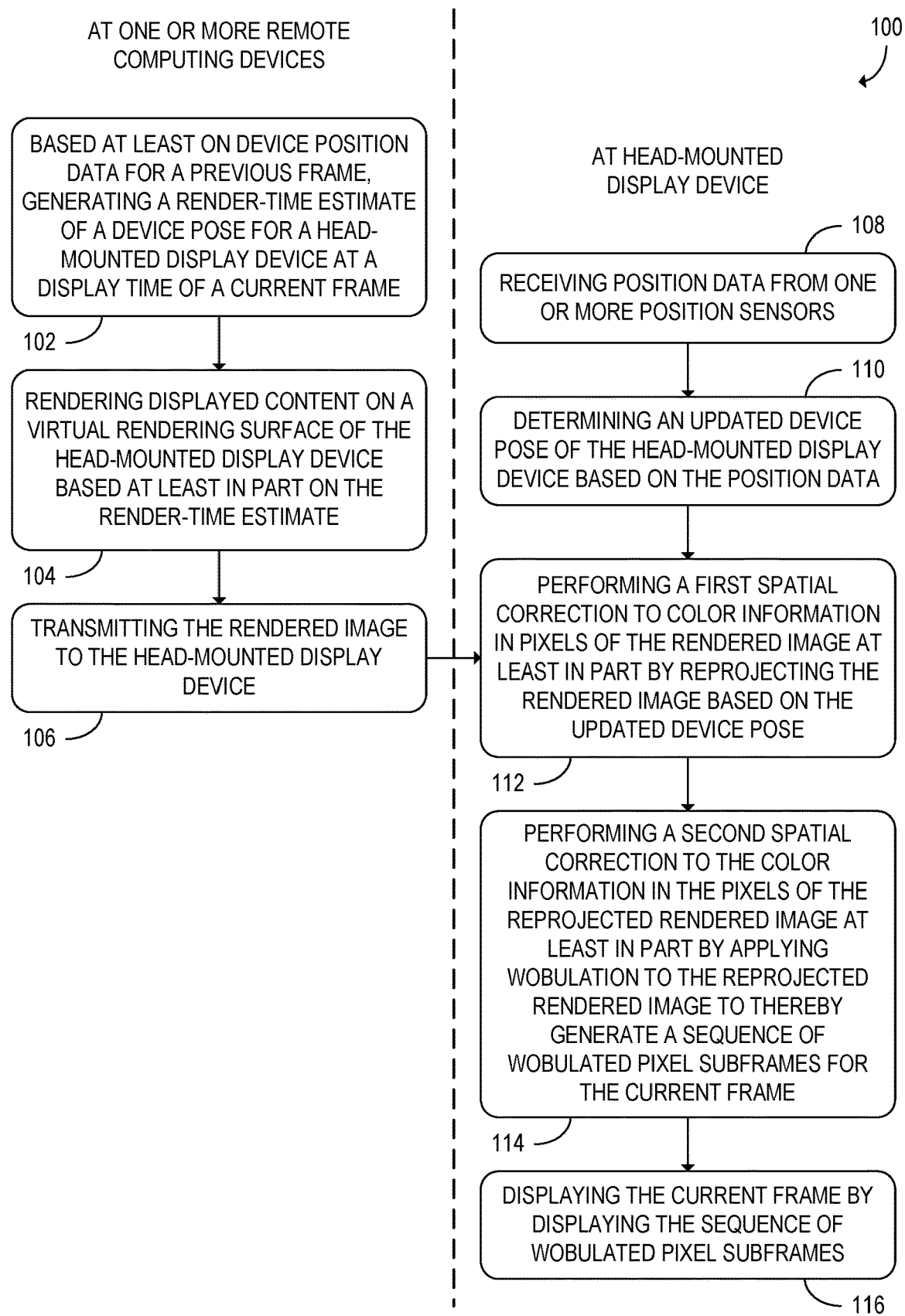
FIG. 2 shows a flowchart of an example method that may be performed at one or more remote computing devices and a head-mounted display device, according to the embodiment of FIG. 1.

FIG. 2 shows a method 100 that may be used with the head-mounted display device 10 and the one or more remote computing devices 80 of FIG. 1 to display content at the head-mounted display device 10. The method 100 may alternatively be used with some other head-mounted display device. In this example, virtual content is displayed on the head-mounted display device 10 in a plurality of frames that each have respective display times. Step 102 of the method 100 may be performed at the one or remote computing devices 80. At step 102, the method 100 may include generating a render-time estimate of a device pose for the head-mounted display device at a current display time of a current frame. The render-time estimate may be generated based at least on device position data for a previous frame. As discussed above, the device position data may include information indicating the position and orientation of the head-mounted display device 10 in space, as well as motion of the head-mounted display device 10. The device position data may be received from the head-mounted display device 10. Thus, the device pose may be estimated at the one or more remote computing devices 80 for the current frame based on sensor data received from the head-mounted display device 10 in the previous frame. The previous frame may be a frame immediately prior to the current frame, or there may be one or more intervening frames between the previous frame and the current frame.

Step 104 may be performed at the one or more remote computing devices 80. At step 104, the method 100 may further include rendering displayed content on a virtual rendering surface of the head-mounted display device 10 to obtain a rendered image. The virtual rendering surface may be a representation of a space in the physical environment at which virtual content may be displayed. For example, the virtual rendering surface may be a cube, a rectangular prism, or some other three-dimensional space within which the coordinates of one or more virtual objects may be located. The displayed content may be rendered based at least in part on the render-time estimate determined at step 102. In some embodiments, the rendered image may include respective color information for a plurality of pixels.

The method 100 may further include, at step 106, transmitting the rendered image to the head-mounted display device 10 from the one or more remote computing devices 80.

Step 108 of the method 100 may be performed at the processor 12 of the head-mounted display device 10. Step 108 may include receiving position data from the one or more position sensors 26. The position data may include data indicating to the orientation, velocity, and/or acceleration of the head-mounted display device 10 as well as its position. At step 110, the method 100 may further include, at the processor 12 of the head-mounted display device 10, determining an updated device pose of the head-mounted display device 10 based on the position data. In some embodiments, the updated device pose may be determined based at least in part on position data from the previous frame and/or one or more other frames that occurred prior to the current frame. The updated device pose is determined at display time, in preparation for displaying of the rendered image.

Step 112 of the method 100 may also be performed at the processor 12 of the head-mounted display device 10. At step 110, the method 100 may further include performing a first spatial correction to color information in pixels of the rendered image. The first spatial correction may be performed at least in part by reprojecting the rendered image based on the updated device pose. When the rendered image is reprojected, the position of at least a portion of the rendered image may be relocated within the virtual rendering surface. The rendered image may be reprojected such that one or more virtual objects appear to be located at their respective world-locked locations when the user views the one or more virtual objects from the position and orientation of the updated device pose. Thus, the apparent positions of virtual objects may appear to remain fixed while the user's head moves.

Step 114 may be performed at the display 32 of the head-mounted display device 10. At step 114, the method 100 may further include performing a second spatial correction to the color information in the pixels of the reprojected rendered image. The second spatial correction may be performed at least in part by applying wobulation to the reprojected rendered image to thereby generate a sequence of wobulated pixel subframes for the current frame. This wobulation may be applied within the panel of the display 32 rather than at an external wobbulator, as discussed in further detail below. By applying wobulation to the reprojected rendered image, the effective resolution of the display 32 may be increased. Although FIG. 2 shows the reprojection and the second spatial correction as separate steps, step 114 and step 116 may be combined into a single operation in which the rendered image is both relocated and wobulated. When step 114 and step 116 are combined, the combined step may be performed within the panel of the display 32.

Step 116 may also be performed at the display 32 of the head-mounted display device 10. At step 116, the method 100 may further include displaying the current frame by displaying the sequence of wobulated pixel subframes. Thus, the current frame may be displayed such that the virtual content has been corrected for changes in device pose and such that the effective resolution of the display 32 has been increased via in-panel wobulation.

Figure 3:
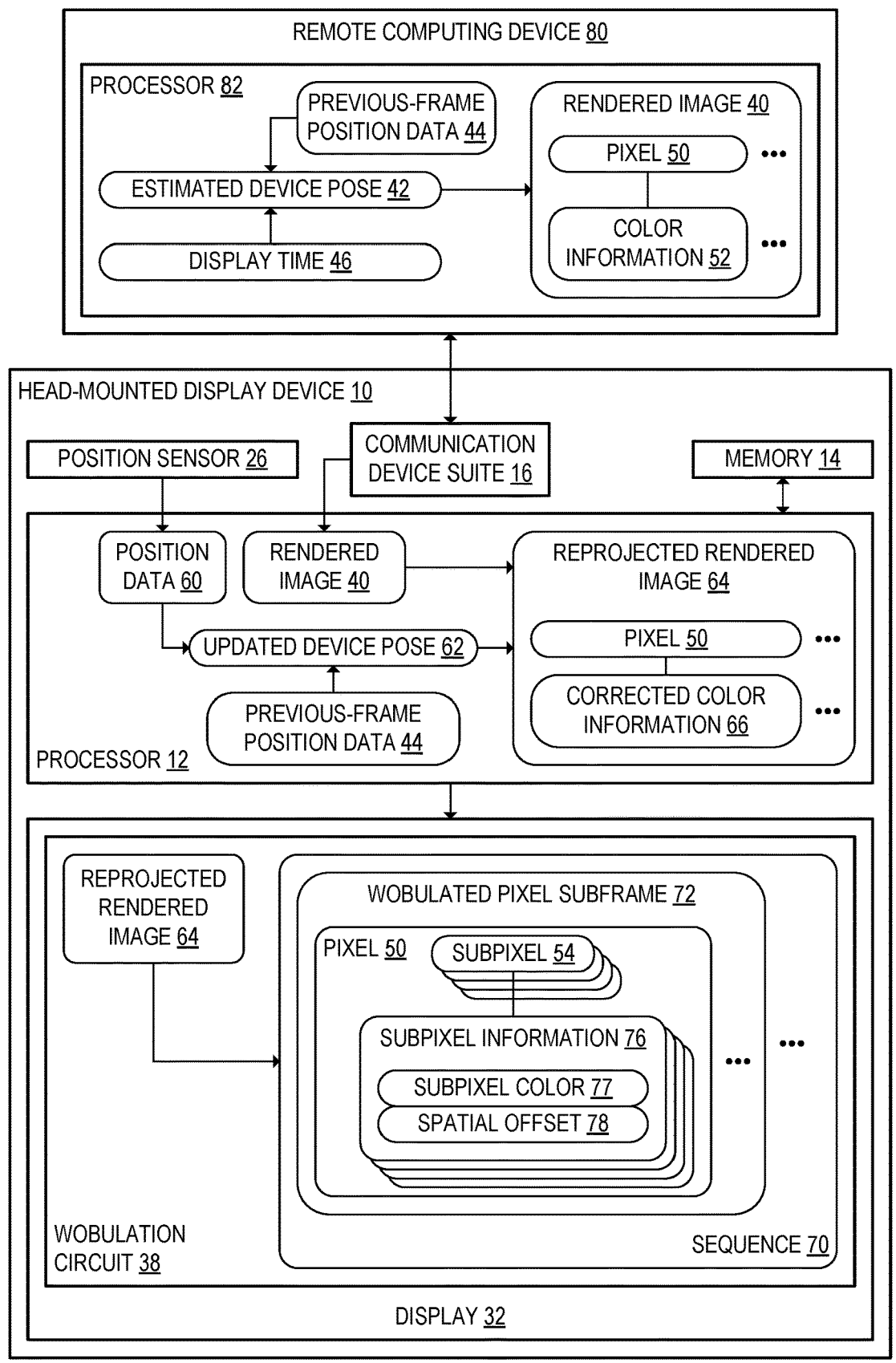
FIG. 3 schematically shows the head-mounted display device and a remote computing device of the one or more remote computing devices, according to the embodiment of FIG. 2.

FIG. 3 schematically shows the head-mounted display device 10 and a remote computing device 80 of the one or more remote computing devices 80. As shown in the example of FIG. 3, the processor 82 of the remote computing device 80 may be configured to compute a render-time estimate of an estimated device pose 42 of the head-mounted display device 10 at a display time 46 of the current frame. The render-time estimate of the estimated device pose 42 may be computed based at least in part on previous-frame position data 44 received from the head-mounted display device 10. Based on the estimated device pose 42, the processor 82 may be further configured to render a rendered image 40 including color information 52 for one or more pixels 50. The processor 82 may render the rendered image 40 such that one or more virtual objects included in the rendered image 40 are shown from the position and orientation of the head-mounted display device 10 estimated in the render-time estimate of the estimated device pose 42.

The processor 12 of the head-mounted display device 10 may be configured to receive, via the communication device suite 16, the rendered image 40 of the current frame that has been rendered at the remote computing device 80. The processor 12 may be further configured to receive the position data 60 from the one or more position sensors 26. The processor 12 may be further configured to determine the updated device pose 62 of the head-mounted display device 10 based on the position data 60, and, in some embodiments, further based on the previous-frame position data 44.

Figure 4A:
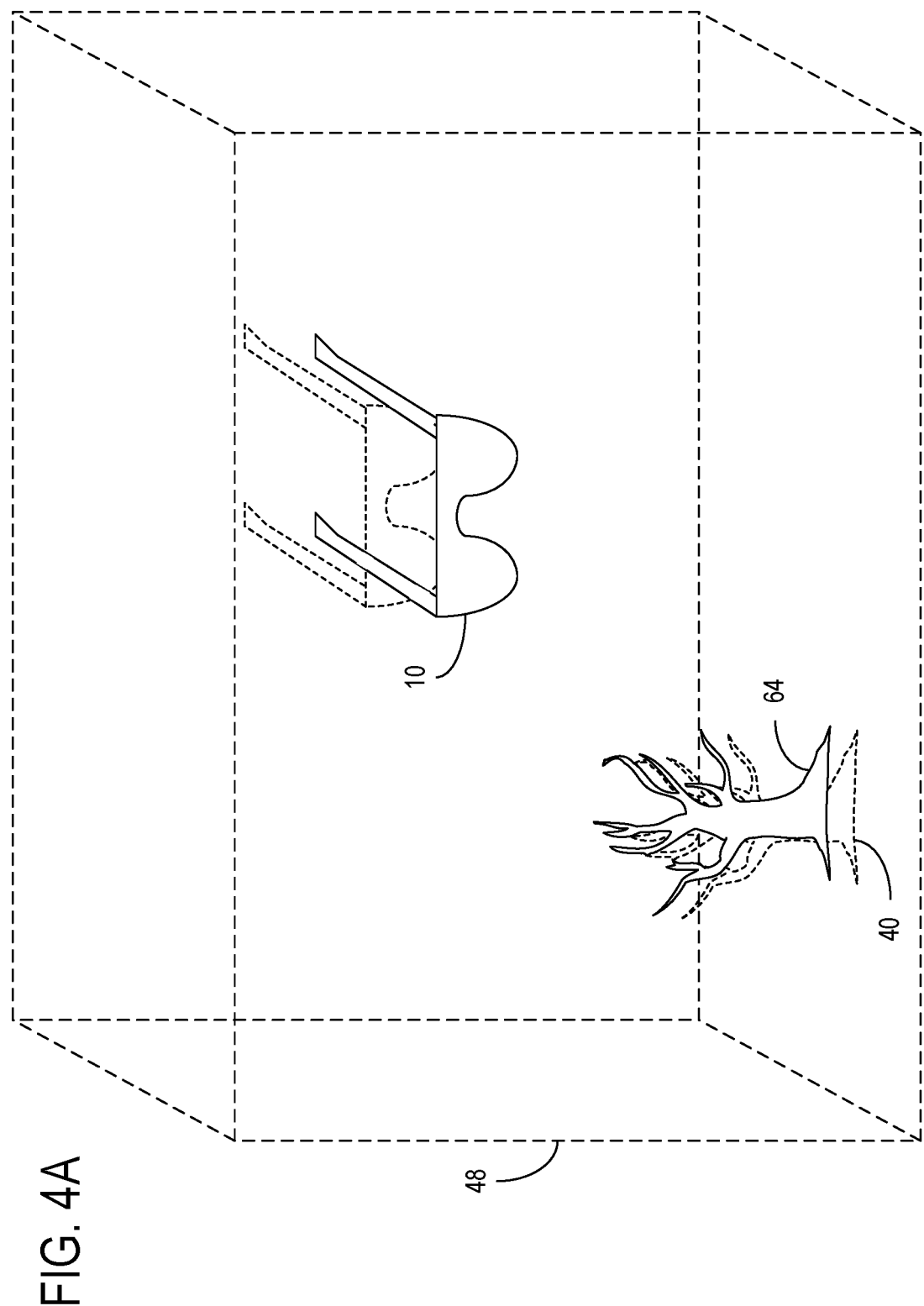
FIG. 4A shows an example reprojected rendered image that is generated based on an updated device pose of the head-mounted display device, according to the embodiment of FIG. 3.

The processor 12 may be further configured to generate a reprojected rendered image 64 at least in part by reprojecting the rendered image 40 based on the updated device pose 62. Generating the reprojected rendered image 64 may include performing a first spatial correction to the rendered image 40 to determine corrected color information 66 for each pixel 50. The reprojection may be an adjustment to the rendered image 40 to account for a difference in position and/or orientation between the estimated device pose 42 and the updated device pose 62. FIG. 4A shows an example virtual rendering surface 48 within which a rendered image 40 is reprojected to thereby obtain a reprojected rendered image 64 that has a different location within the virtual rendering surface 48. In the example of FIG. 4A, the updated device pose 62 indicates that the head-mounted display device 10 is located at a lower height than the height indicated in the estimated device pose 42. Thus, the reprojected rendered image 64 is displayed at an increased height relative to the rendered image 40.

Figure 4B:
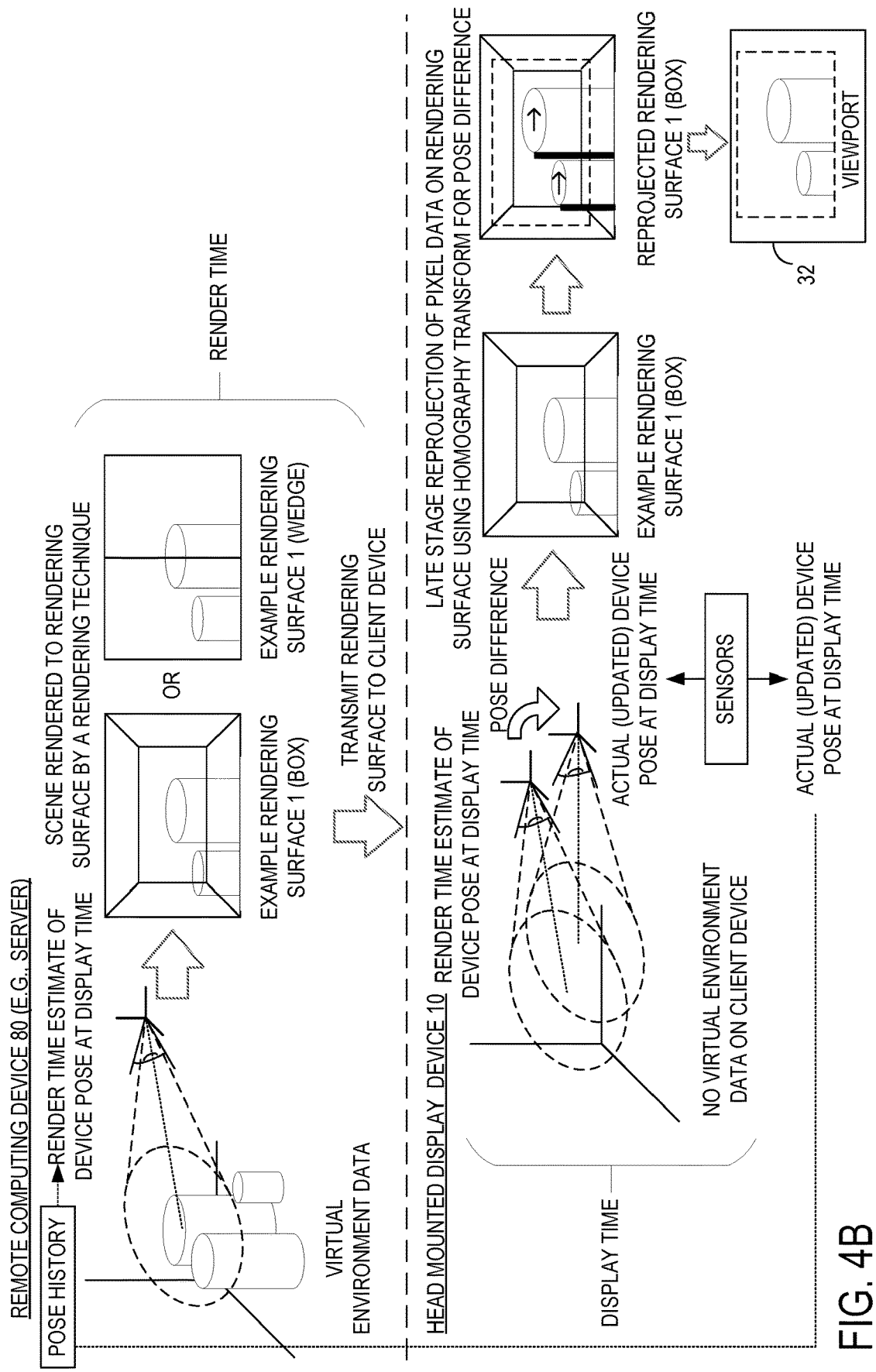
FIG. 4B shows an example of a late stage reprojection process that may be implemented by the embodiment of FIG. 3 to generate the reprojected rendered image of FIG. 4A.

FIG. 4B shows an example of a late stage reprojection process that may be implemented to generate the reprojected rendered image 64 of FIG. 4A. At upper left in FIG. 4B, the process begins with a server-side rendering phase in which the remote computing device 80 (e.g., a server) receives a latest device pose of the head mounted display device 10 and stores it in a pose history. Based on the pose history, algorithms on the remote computing device 80 compute a render-time estimated device pose 42 at a display time, and render a scene based on the estimated device pose 42. The scene is rendered by projecting from the estimated device pose 42 and determining the objects in the virtual environmental data that are included within an defined area wider than the field of view of a virtual camera positioned at the estimated device pose 42, as shown in dashed lines. By rendering a wider area, allowance is made for the fact that the viewport may move within the wider area as the device pose is updated, as described below. The image that is virtually captured by a virtual camera oriented according to the estimated device pose 42 is then rendered according to a rendering technique to a rendering surface, which as shown may be a rendering box (a box-shaped surface with 5 sides) or a rendering wedge (a two-sided surface with right and left sides), for example.

It will be appreciated that the rendered rendering surface includes an array of pixels 50 in each of one or more component logical surfaces of the rendering surface. The data size of the rendering surface is smaller than the virtual environmental data stored at the remote computing device 80. Server-side rendering enables the faster processors 82 and larger memory 84 of the server to be used to store and render the scenes that will be displayed on the head-mounted display device 10, while transmitting those scenes as relatively lightweight rendered rendering surfaces to the head-mounted display device 10 over a computer network such as the Internet or a local area network. The rendering surface for the frame to be displayed at display time is transmitted from the remote computing device 80 to the head-mounted display device 10. At the head-mounted display device 10, on-board sensors such as IMUs, etc., as described above, determine an updated device pose for the device 62, and also determine a difference (in the form of a 6DOF pose transform, for example) between the estimated device pose 42 and the updated device pose 62. Next, in a process known as late stage reprojection, the pixel data in the rendering surface is reprojected within the rendering surface using a homographic transform that has been computed based on the pose difference. The pixel data in the reprojected rendering surface is then written to a viewport and displayed on a display 32 associated with the head-mounted display device 10.

The updated device pose is transmitted back to the remote computing device 80 to be included in the pose history and used in subsequent pose predictions. In this way, the final display of the reprojected rendered image 64 can be adjusted based on a display-time update to the device pose, which will result in more accurate positioning of the displayed image on the display 32. This can be especially important, for example, in the display of world-locked holograms that are supposed to appear positioned on real-world objects, since even slight variations in position of such objects based on pose estimation errors can cause drift or otherwise degrade the illusion of these holograms being world-locked. Although only one image and one display 32 has been described with reference to FIG. 4B, it will be appreciated that the late stage reprojection process may be repeated for each of three color channels and for each of two different near eye displays in a stereoscopic near eye display of head mount display device 10.

Figure 5:
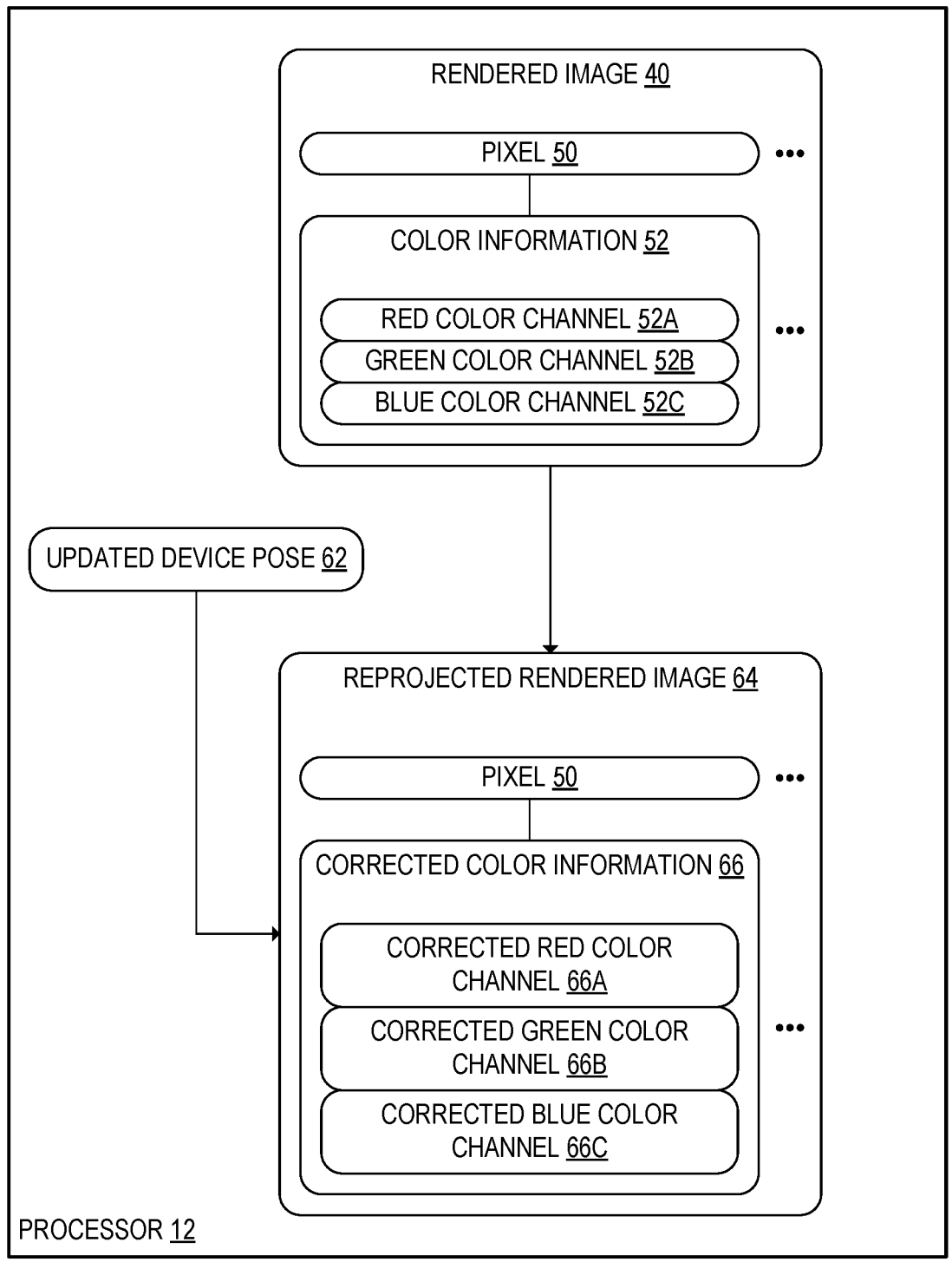
FIG. 5 shows the rendered image and the reprojected rendered image, respectively including color information and corrected color information, according to the embodiment of FIG. 3.

Accordingly, in some embodiments, as shown in FIG. 5, the processor 12 may be configured to perform the first spatial correction separately for each of a plurality of color channels of the rendered image 40. As shown in the example of FIG. 5, the color information 52 of the rendered image 40 may include a red color channel 52A, a green color channel 52B, and a blue color channel 52C that respectively include the red, green, and blue color values for each pixel 50. When the processor 12 performs the first spatial correction, the processor 12 may be configured to generate corrected color information 66 include a corrected red color channel 66A, a corrected green color channel 66B, and a corrected blue color channel 66C. By separately reprojecting the different color channels included in the color information 52, the processor 12 may account for differences in angles of refraction for different wavelengths of light. Accounting for these wavelength differences when performing the first spatial correction may result in an effective resolution increase, referred to as superresolution, for the reprojected rendered image 64 compared to the rendered image 40.

Returning to FIG. 3, the processor 12 of the head-mounted display device 10 may be further configured to output the reprojected rendered image 64 to the display 32. The display 32 may be configured to apply a second spatial correction to the corrected color information in the pixels 50 of the reprojected rendered image 64 at least in part by applying wobulation to the reprojected rendered image 64. The second spatial correction may be performed at a wobulation circuit 38 included in the display 32. When applying the second spatial correction, the display 32 may generate a sequence 70 of wobulated pixel subframes 72 for the current frame. Each pixel 50 included in the display 32 may include a plurality of subpixels 54. When the display 32 generates a wobulated pixel subframe 72, the display 32 may generate respective subpixel information 76 with which each subpixel 54 may be displayed in that wobulated pixel subframe 72. As discussed in further detail below, the subpixel information 76 for a subpixel 54 may include a subpixel color 77 and/or a spatial offset 78.

The display 32 may be further configured to display the current frame by displaying the sequence 70 of wobulated pixel subframes 72. When the sequence 70 is displayed, each subpixel 54 may be displayed according to its respective subpixel data 76 in each wobulated pixel subframe 72. In some embodiments, the sequence 70 of wobulated pixel subframes 72 may be displayed at a display rate that is asynchronous with the rendering rate at which the processor 12 outputs reprojected rendered images 64.

An example sequence 70 is shown in FIGS. 6A-6D. In the example of FIGS. 6A-6D, the display 32 includes a plurality of pixels 50 that each include a respective plurality of addressable subpixels 54. The wobulation circuit 38 may be configured to apply wobulation to the reprojected rendered image 64 at least in part by readdressing one or more subpixels 54 of each of the plurality of pixels 50. When the wobulation circuit 38 readdresses the one or more subpixels 54, the wobulation circuit 38 may modify which subpixels 54 are assigned to which pixels 50, and to which locations within those pixels 50. In embodiments in which the display 32 is an LCoS display, wobulation may be applied to the reprojected rendered image 64 without requiring that the head-mounted display device 10 include an external wobulator in addition to the LCoS display. Thus, the size and weight of the head-mounted display device 10 may be reduced by using an LCoS display.

Figure 6A:
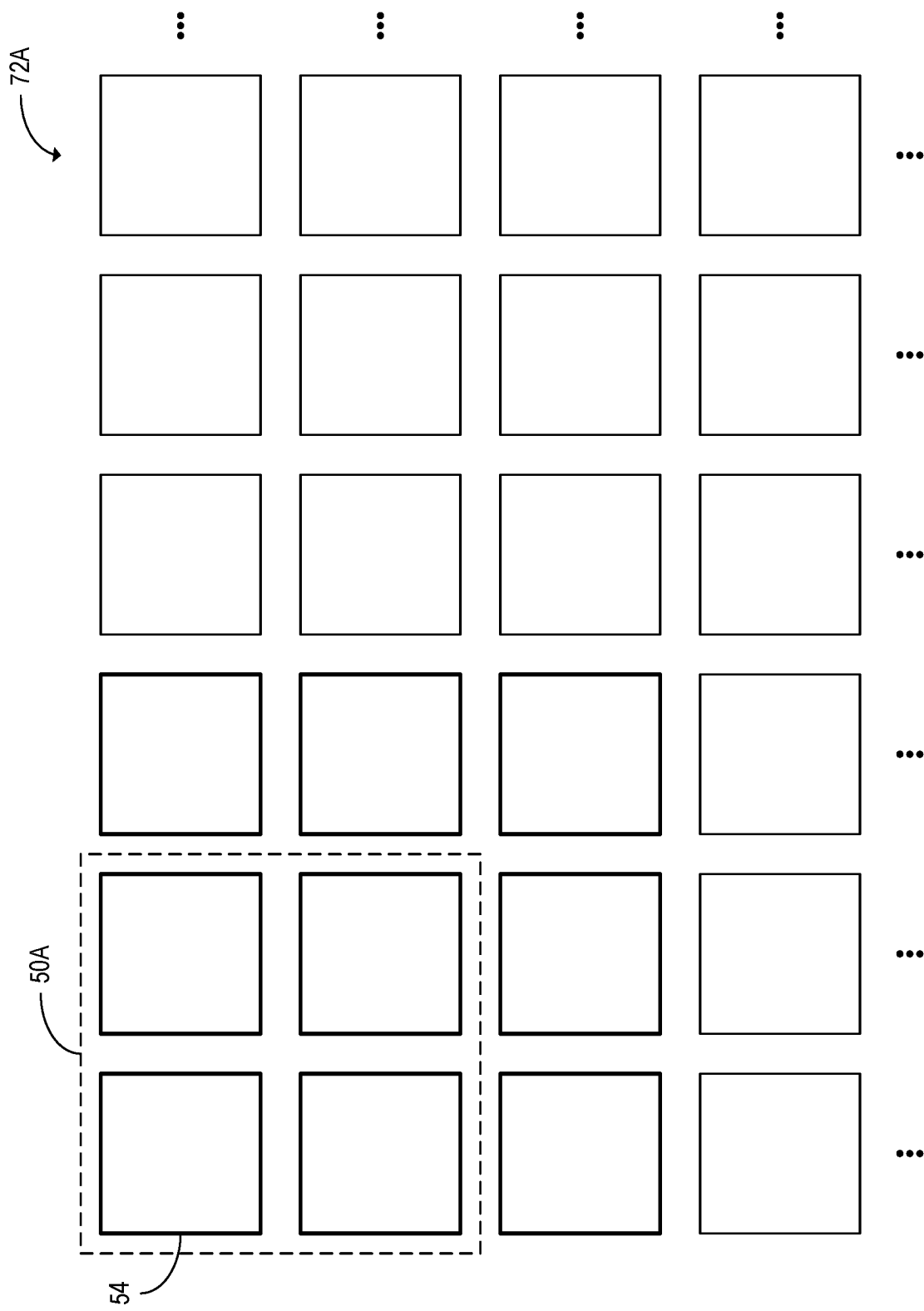
FIGS. 6A-6D show respective spatial offsets applied to a pixel in a sequence of four wobulated pixel subframes, according to the embodiment of FIG. 3.
Figure 6B:
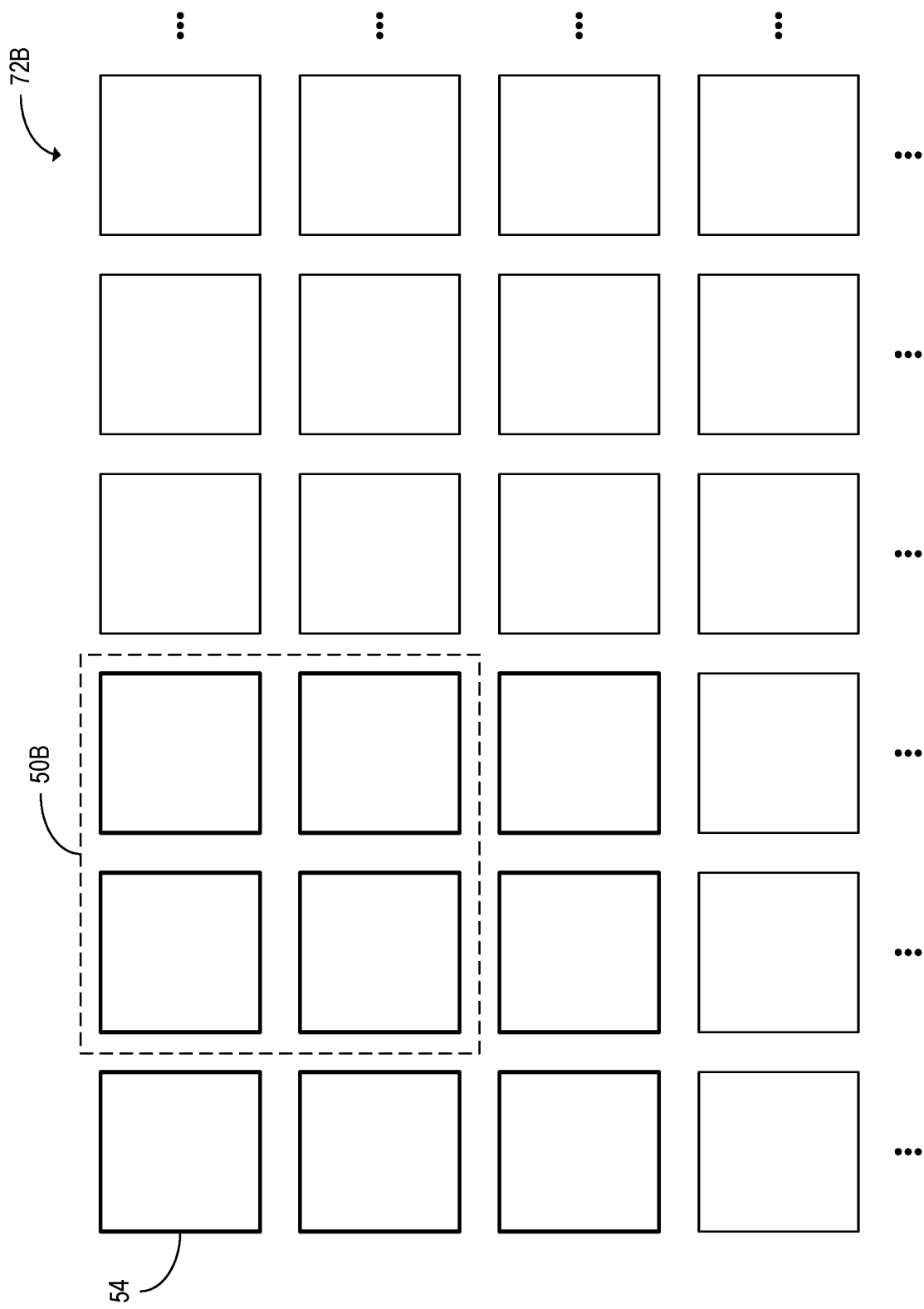
Figure 6C:
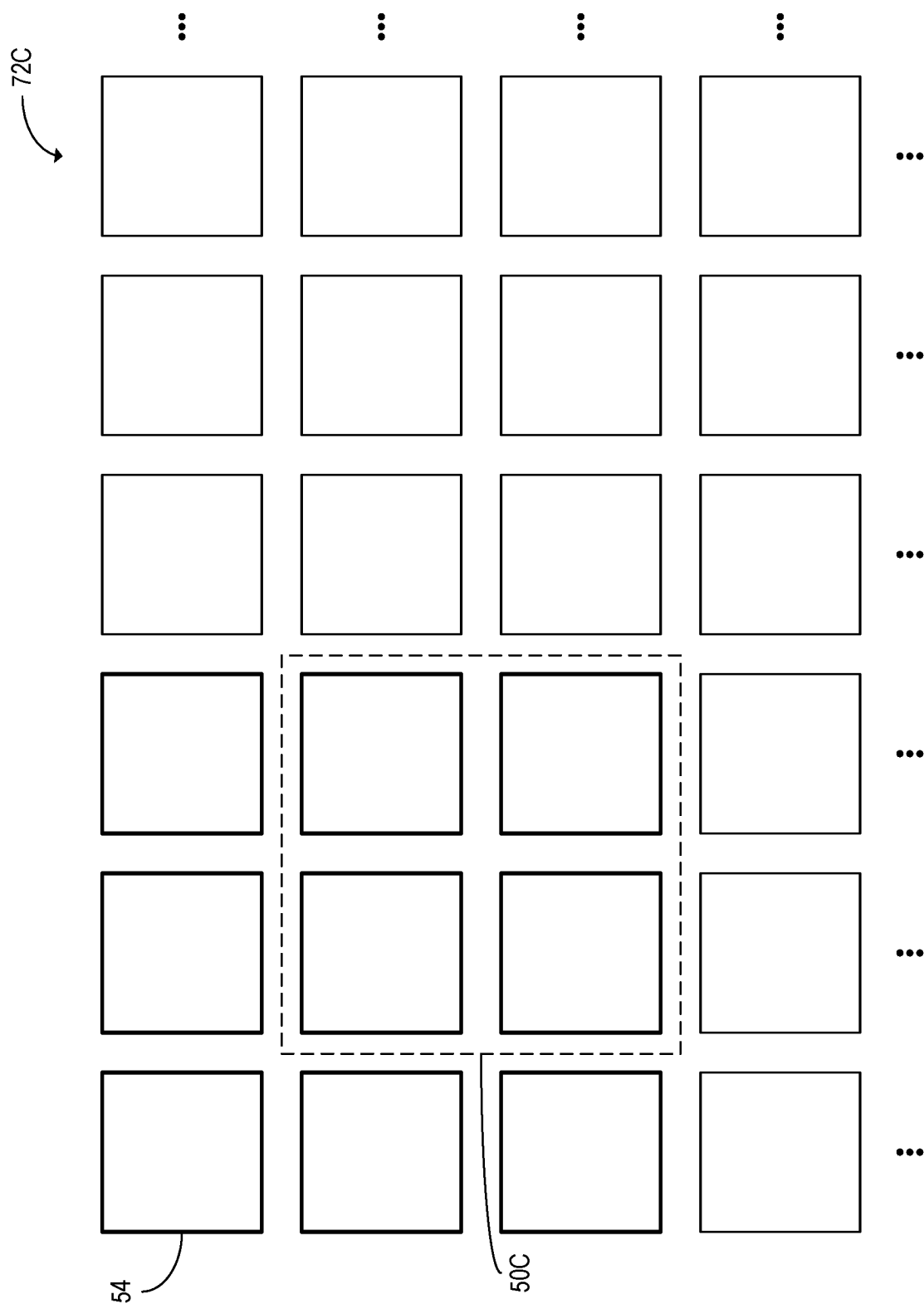
Figure 6D:
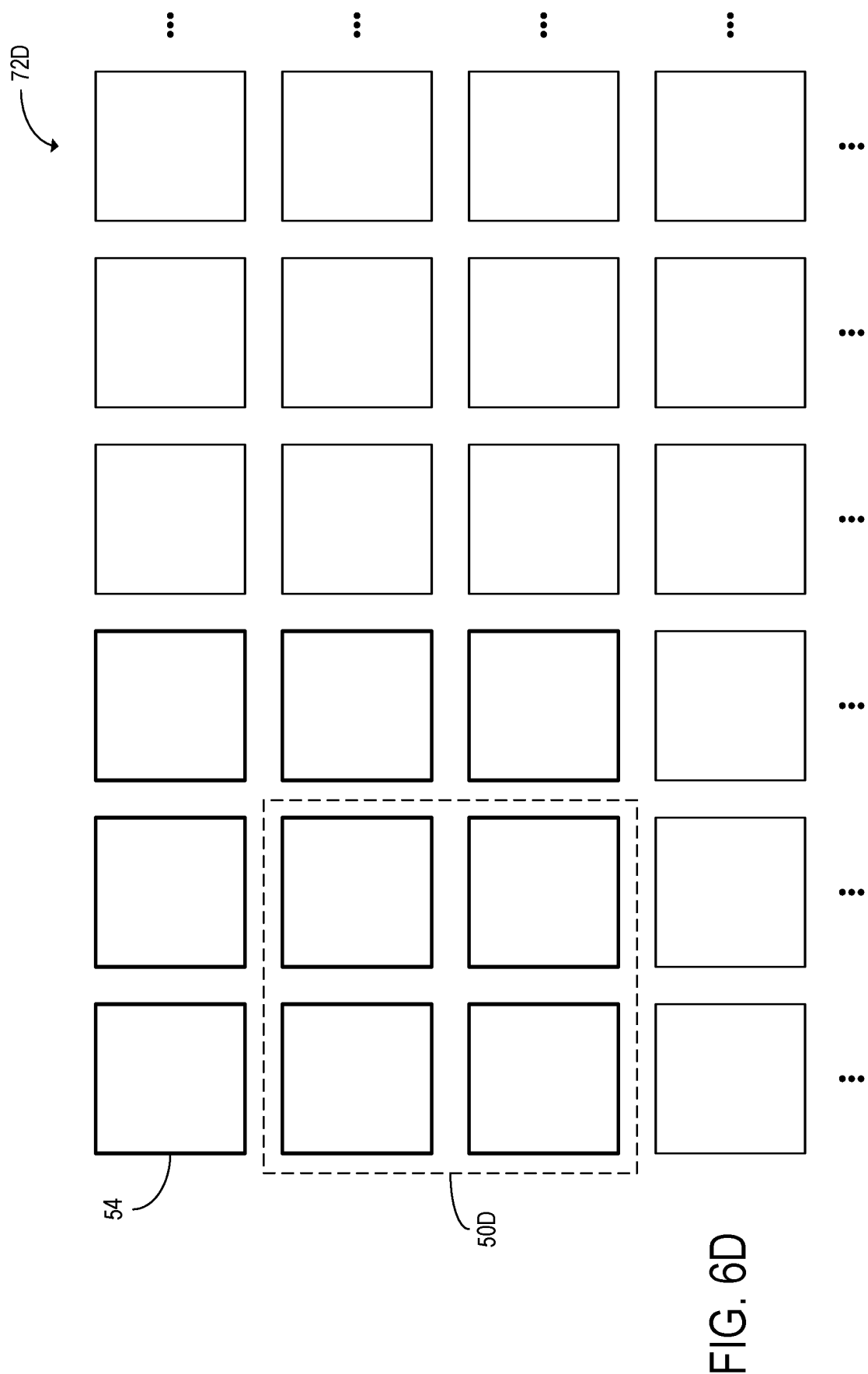

Each wobulated pixel subframe 72 of the sequence 70 may have a corresponding spatial offset 78. In some embodiments, as in the example of FIGS. 6A-6D, the corresponding spatial offset 78 of each wobulated pixel subframe 72 relative to an initial wobulated pixel subframe 72 of the sequence 70 may be a vertical offset by one subpixel 54, a horizontal offset by one subpixel 54, or a vertical offset by one subpixel and a horizontal offset by one subpixel 54. FIG. 6A shows a first pixel 50A formed by a square of four subpixels 54 during a first wobulated pixel subframe 72A. In FIG. 6B, the plurality of subpixels 54 are readdressed such that in a second wobulated pixel subframe 72B, a second pixel 50B is formed by a square of four subpixels 54 that is shifted to the right by one subpixel 54 relative to the first wobulated pixel subframe 72A shown in FIG. 6A. FIG. 6C shows a third wobulated pixel subframe 72C in which the plurality of subpixels 54 are readdressed such that a third pixel 50C is formed by a square of subpixels 54 that is shifted downward by one subpixel 54 relative to the second wobulated pixel subframe 72B. FIG. 6D shows a fourth wobulated pixel subframe 72D in which the plurality of subpixels 54 are readdressed such that a fourth pixel 50D is formed by a square of subpixels 54 that is shifted to the left by one subpixel 54 relative to the third wobulated pixel subframe 72C. Following the fourth wobulated pixel subframe 72D, the wobulation circuit 38 may return to the pixel addressing configuration of the first wobulated pixel subframe 72A.

As shown in FIGS. 6A-6D, over the sequence 70 of wobulated pixel subframes 72, the wobulation circuit 38 may modify the respective spatial offsets 78 of the wobulated pixel subframes 72 to move each pixel 50 through a cycle of four different positions. The spatial offsets 78 applied to the pixels 50 may effectively quadruple the resolution of the display 32. The display 32 may thereby display the reprojected rendered image 64 as though the number of pixels 50 included in the display 32 were four times greater, but without incurring the increases in projector size or power consumption that would result from quadrupling the number of pixels 50 included in the display 32. In addition, the superresolution that is achieved as a result of wobulation may be independent from the superresolution that is achieved as a result of separately reprojecting the color channels of the rendered image 40. Thus, the superresolution achieved in the example of FIGS. 6A-6D may still be achieved in embodiments in which the corrected color information 66 includes a plurality of separately reprojected color channels.

Figure 7A:
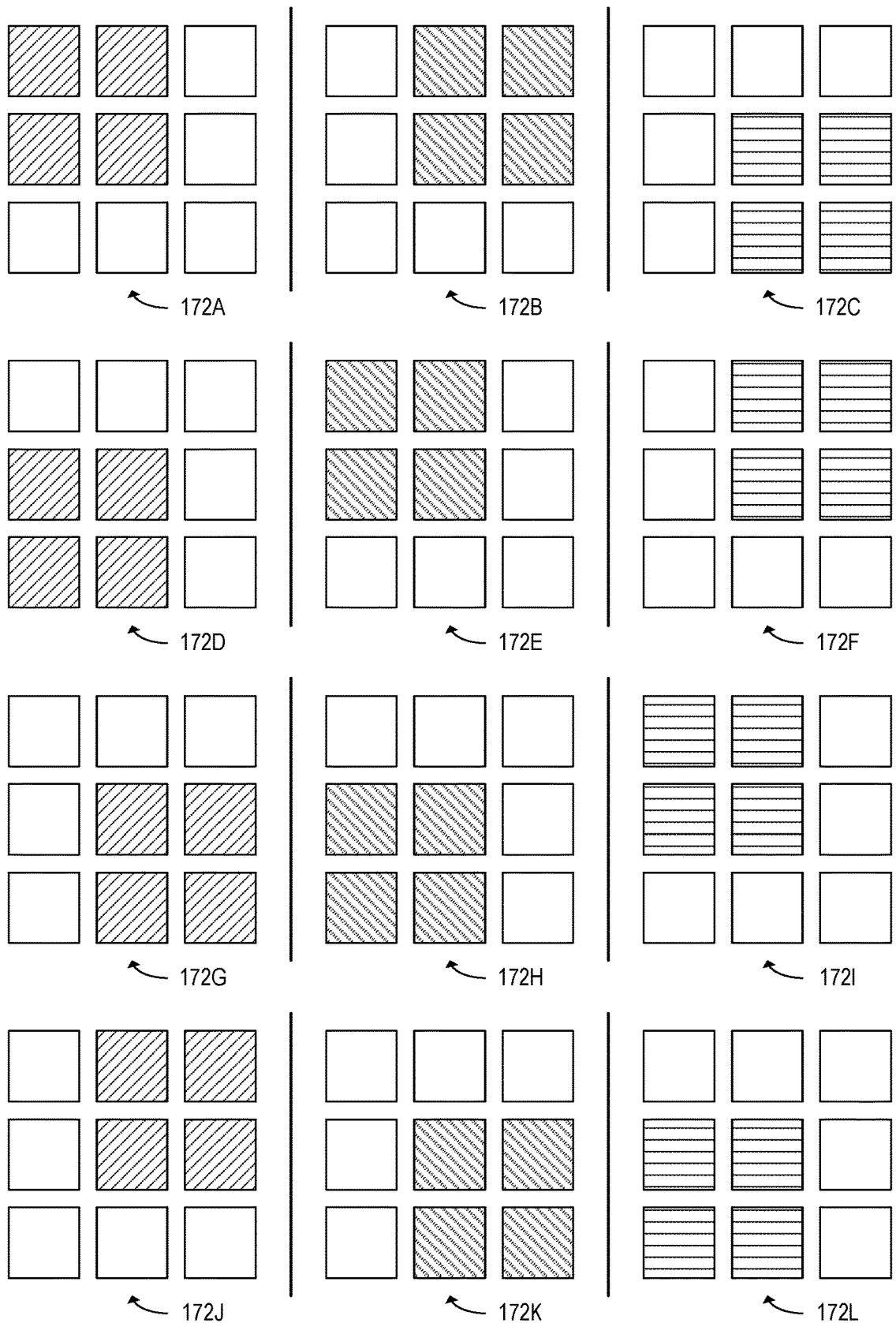
FIG. 7A shows a respective plurality of spatial offsets and subpixel colors applied to a pixel in an example sequence of twelve wobulated pixel subframes, according to the embodiment of FIG. 3.

Returning to FIG. 3, in addition to having a respective spatial offset 78, each wobulated pixel subframe 72 included in the sequence 70 may, in some embodiments, have a corresponding subpixel color 77. For example, each subpixel color 77 may be selected from the group consisting of red, green, and blue. In such embodiments, the sequence 70 of wobulated pixel subframes 72 may include one or more red wobulated pixel subframes, one or more green wobulated pixel subframes, and one or more blue wobulated pixel subframes. FIG. 7A shows a sequence 170 of twelve wobulated pixel subframes 172A-172L. The sequence 170 of FIG. 7A cycles through subpixel colors 77 and spatial offsets 78 such that each subpixel color 77 selected from among red, green, and blue is displayed at each of the four spatial offsets 78 shown in FIGS. 6A-6D. In the sequence 170, the first wobulated pixel subframe 172A, the fourth wobulated pixel subframe 172D, the seventh wobulated pixel subframe 172G, and the tenth wobulated pixel subframe 172J are red; the second wobulated pixel subframe 172B, the fifth wobulated pixel subframe 172E, the eighth wobulated pixel subframe 172H, and the eleventh wobulated pixel subframe 172K are green; and the third wobulated pixel subframe 172C, the sixth wobulated pixel subframe 172F, the ninth wobulated pixel subframe 172I, and the twelfth wobulated pixel subframe 172L are blue.

Figure 7B:
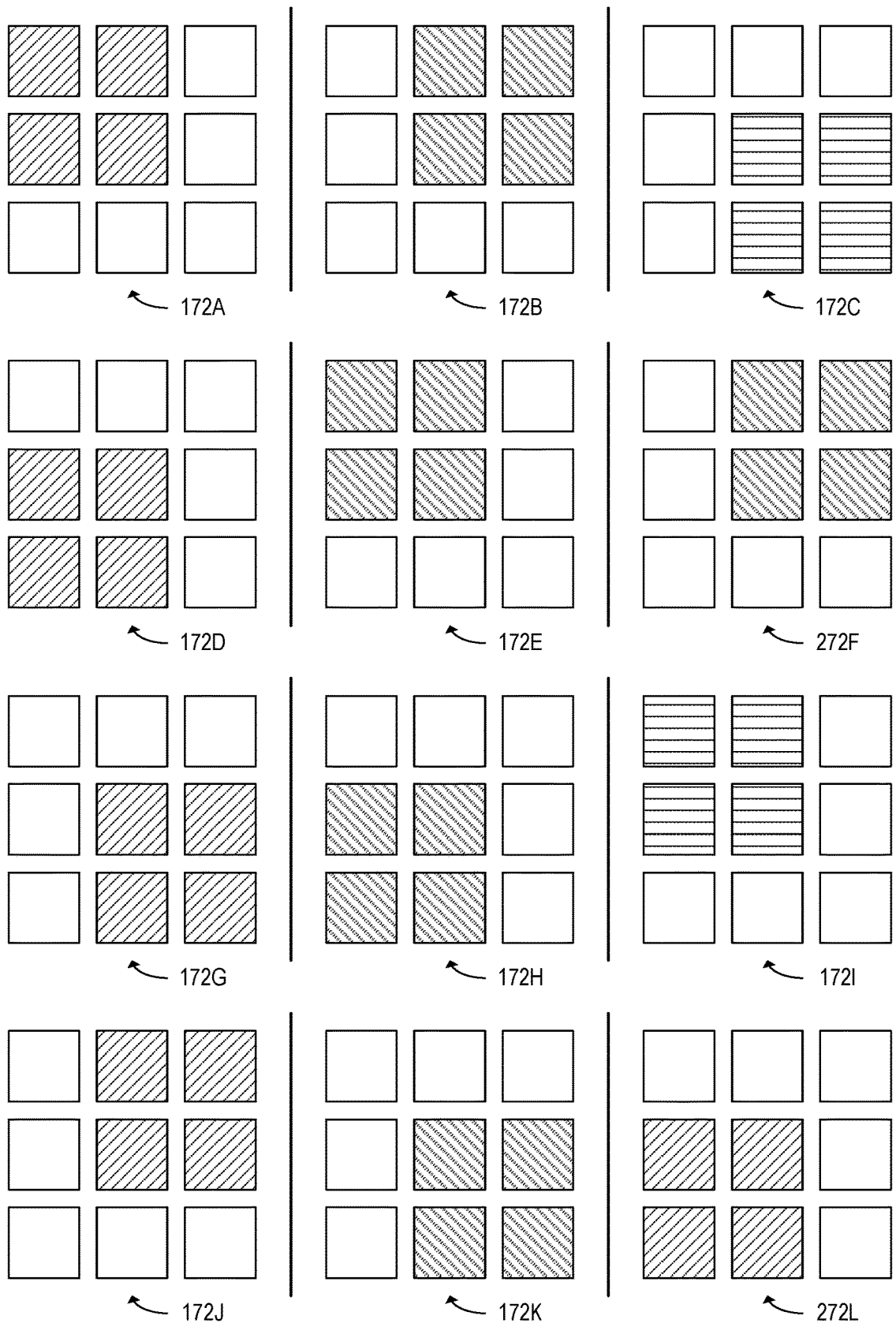
FIG. 7B shows a respective plurality of spatial offsets and subpixel colors applied to a pixel in another example sequence of twelve wobulated pixel subframes, according to the embodiment of FIG. 3.

In other embodiments, as shown in FIG. 7B, the wobulation circuit 38 may be configured to generate a sequence 270 in which a number of the one or more red wobulated pixel subframes, a number of the one or more green wobulated pixel subframes, and a number of the one or more blue wobulated pixel subframes included in the sequence 270 are not all equal to each other. The wobulated pixel subframes 72 included in the sequence 270 of FIG. 7B each have the same respective subpixel colors 77 and spatial offsets 78 as those of the sequence 170 of FIG. 7A, except for the sixth wobulated pixel subframe 272F and the twelfth wobulated pixel subframe 272L. The sixth wobulated pixel subframe 272F is green instead of blue, and the twelfth wobulated pixel subframe 272L is red instead of blue. The number of wobulated pixel subframes 72 in a sequence 70 that have each subpixel color 77 may, for example, be selected to match the sensitivity of the human eye to different colors of light. In some embodiments, the ratio of wobulated pixel subframes 72 with each subpixel color 77 may be dynamically adjusted based on lighting conditions detected by the outward-facing optical sensor 22 and/or the inward-facing optical sensor 24 of the head-mounted display device 10.

Figure 8A:
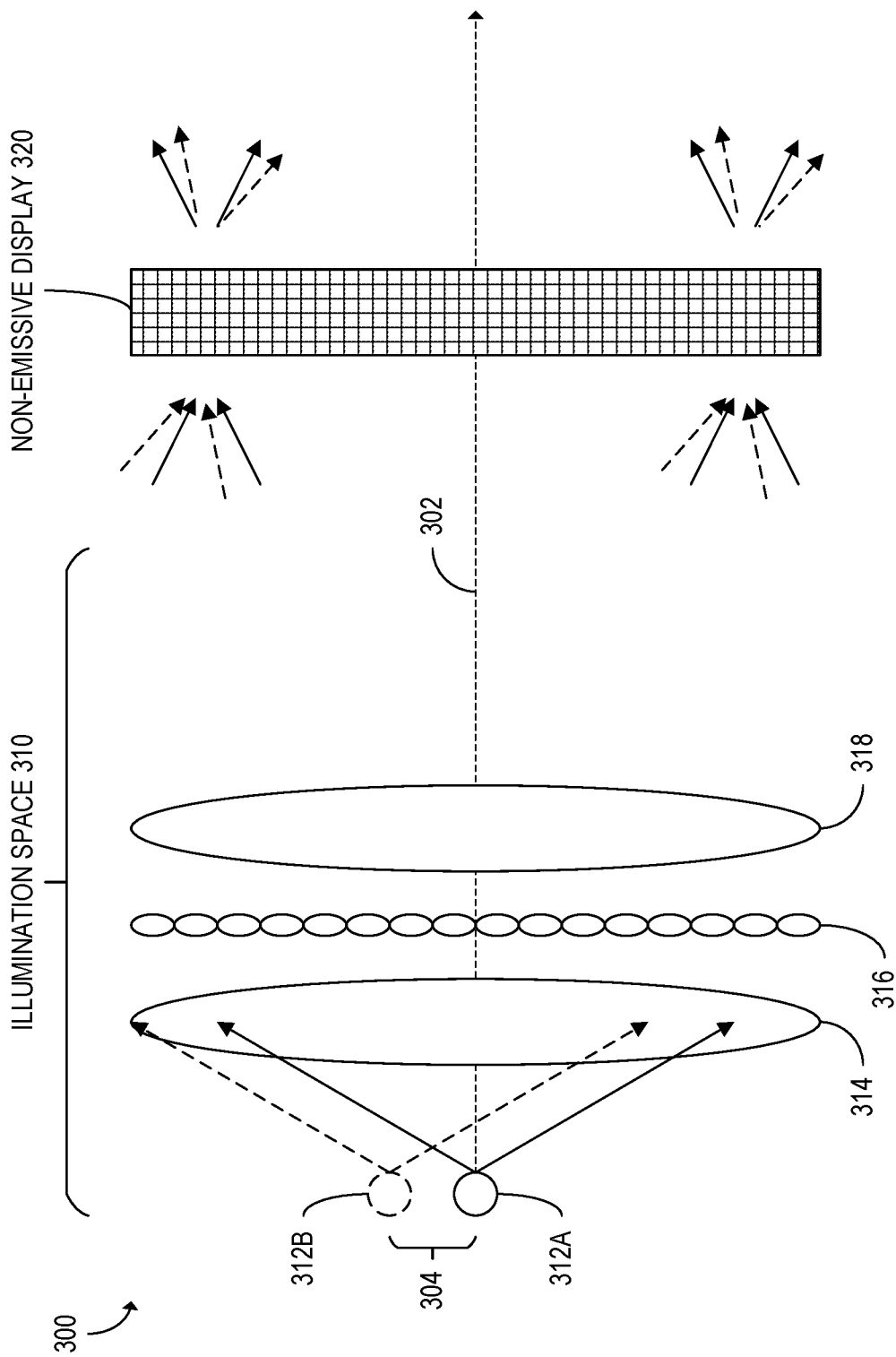
FIGS. 8A-8B show an example architecture of a projector including a pupil replicated waveguide, according to the embodiment of FIG. 1.
Figure 8B:
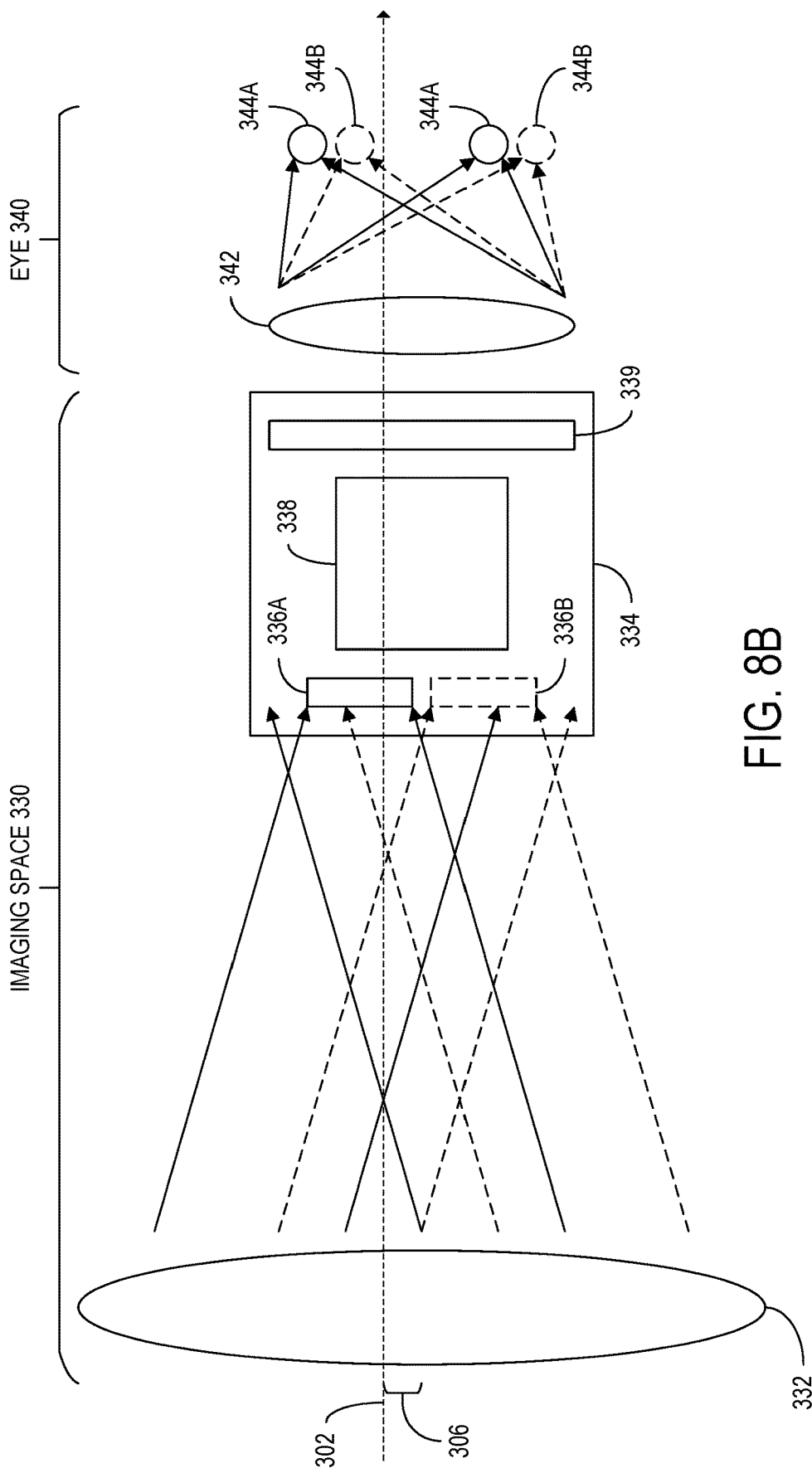

FIG. 8A-8B show an example architecture of a projector 300 that may be included in the display 32 of the head-mounted display device, according to one example embodiment. The example projector 300 may include an illumination space 310, a non-emissive display 320, an imaging space 330, and an eye 340 of the user. As shown in FIG. 8A, a first illumination source 312A and a second illumination source 312B may be located in the illumination space 310, with a first displacement 304 between them.

Light emitted by the first illumination source 312A and the second illumination source 312B may pass through a condenser lens 314, one or more beam shaping optical elements 316, and a homogenizing lens 318. The condenser lens 314 may form respective convergent beams from the light emitted by the first illumination source 312A and the second illumination source 312B. In the example of FIGS. 8A-8B, the first illumination source is located along a center axis 302 of the condenser lens 314 and the homogenizing lens 318. The one or more beam shaping optical elements 316 may be a microlens array, as shown in the example of FIG. 8A, or may alternatively include a filter diffuser of a polarization recovery element.

Light that passes through the homogenizing lens 318 may pass through a non-emissive display 320. For example, the non-emissive display 320 may be an LCoS display, a liquid crystal display (LCD), or a digital light processing (DLP) display. The term non-emissive display is a term of art that means a display in which light is produced behind a user-facing display surface and an image is formed by filtering this light at the non-emissive display. Thus, a non-emissive display receives backlight and transmits filtered light. In such a display, since the source of the light is not within the display itself but is in the backlight, the display is referred to as being non-emissive. As shown in the example projector 300 of FIG. 8A, light emitted by the second illumination source 312B may have an angular offset when passing through the non-emissive display 320 relative to light emitted by the first illumination source 312A.

FIG. 8B shows the imaging space 330 and the eye 340 of the user according to the example of FIG. 8A. The imaging space 330 may include a collimating lens 332 and a pupil replicated waveguide 334. In some embodiments, as shown in FIG. 8B, the collimating lens 332 and the pupil replicated waveguide 334 may be offset by a second displacement 306 from the center axis 302 of the condenser lens 314 and the homogenizing lens 318. The collimating lens 332 may be configured to receive light that passes through the non-emissive display 320 and focus that light onto the pupil replicated waveguide 334.

The pupil replicated waveguide 334 may include a first input grating 336A, a second input grating 336B, a redirection grating 338, and an extraction grating 339. The first input grating 336A and the second input grating 336B may be a first entrance port and a second entrance port for respective subpixels 54, with the first input grating 336A being configured to receive light originally output by the first illumination source 312A and the second input grating 336B being configured to receive light originally output by the second illumination source 312B. The first input grating 336A and the second input grating 336B may each have a respective grating period. The grating periods of the first input grating 336A and the second input grating 336B may be different from each other, such that the first input grating 336A has a first coupling angle and the second input grating has a second coupling angle. Thus, the light received at the first input grating 336A and the light received at the second input grating 336B may be transmitted through their respective gratings at different angles, as discussed in further detail below.

After passing through the first input grating 336A and the second input grating 336B, the light may pass through the redirection grating 338 and the extraction grating 339 to reach the user's eye 340. In the embodiment of FIGS. 8A-8B, a single redirection grating 338 and a single extraction grating 339 are used for both the first input grating 336A and the second input grating 336B. In other embodiments, separate redirection gratings 338 and/or separate extraction gratings 339 may be used for the first input grating 336A and the second input grating 336B. Additionally or alternatively, in some embodiments, the projector 300 may include a waveguide with some other architecture. For example, the waveguide may include one or more prisms, one or more cascaded half-tone mirrors, or one or more pinlight mirrors. In other embodiments, the waveguide may include one or more exit pupils without including an extraction grating 339.

The lens 342 of the user's eye 340 may focus the light received from the pupil replicated waveguide 334 onto the user's retina to form a first subpixel image 344A and a second subpixel image 344B that are spatially offset from each other. Thus, due to the first displacement 304 between the first illumination source 312A and the second illumination source 312B, the first subpixel image 344A and the second subpixel image 344B may be displayed at different locations in the user's field of view.

Figure 9A:
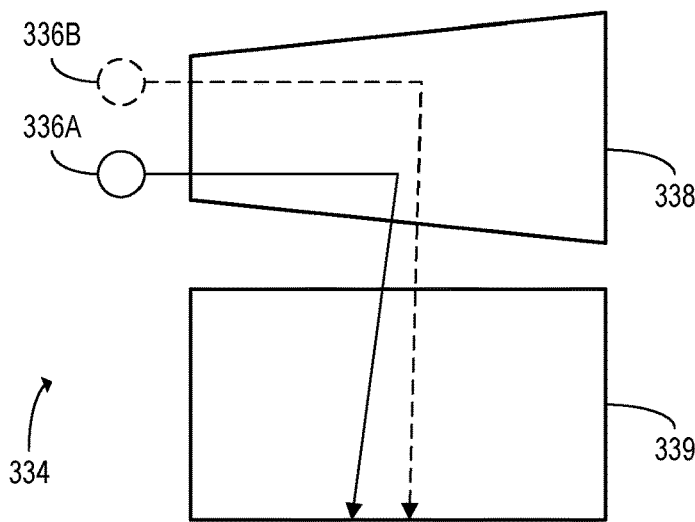
FIG. 9A shows a top view of an example pupil replicated waveguide, according to the embodiment of FIGS. 8A-8B.
Figure 9B:
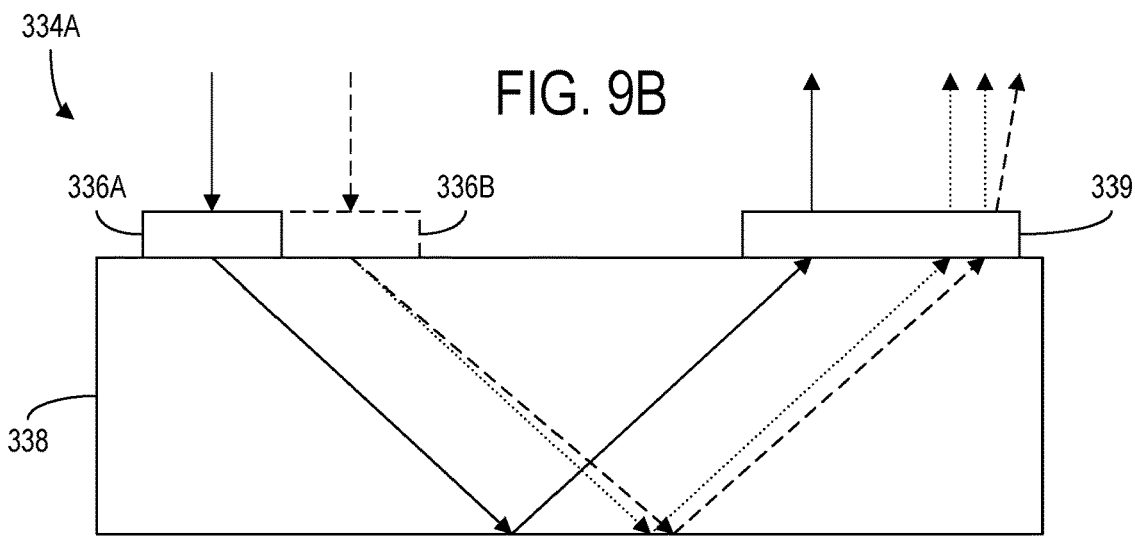
FIG. 9B shows a cross-sectional view of the example pupil replicated waveguide of FIG. 9A.

FIG. 9A shows a top view of the pupil replicated waveguide 334 shown in FIG. 8B. In addition, FIG. 9B shows a cross-sectional view of the pupil replicated waveguide 334. As shown in FIG. 9B, light that has passed through the first input grating 336A and the second input grating 336B is redirected via total internal reflection within the redirection grating 338 to impinge upon the extraction grating 339. Since the first input grating 336A and the second input grating 336B have different coupling angles in the example of FIGS. 9A-9B, the light that has passed through the second input grating 336B travels through the redirection grating 338 at a different angle from that of the light that has passed through the first input grating 336A. The light dashed line in FIG. 9B shows the path that the light passing through the second input grating 336B would take if the first input grating 336A and the second input grating 336B had the same coupling angle. The point at which the light that passes through the second input grating 336B impinges upon the extraction grating 339 is also spatially offset due to the difference between the first coupling angle and the second coupling angle. In addition, since the light that passes through the first input grating 336A and the light that passes through the second input grating 336B impinge upon the extraction grating 339 at different angles, they are also output to the user's eye 340 at different angles. Thus, the first subpixel image 344A and the second subpixel image 344B may be displayed at different locations.

Figure 9C:
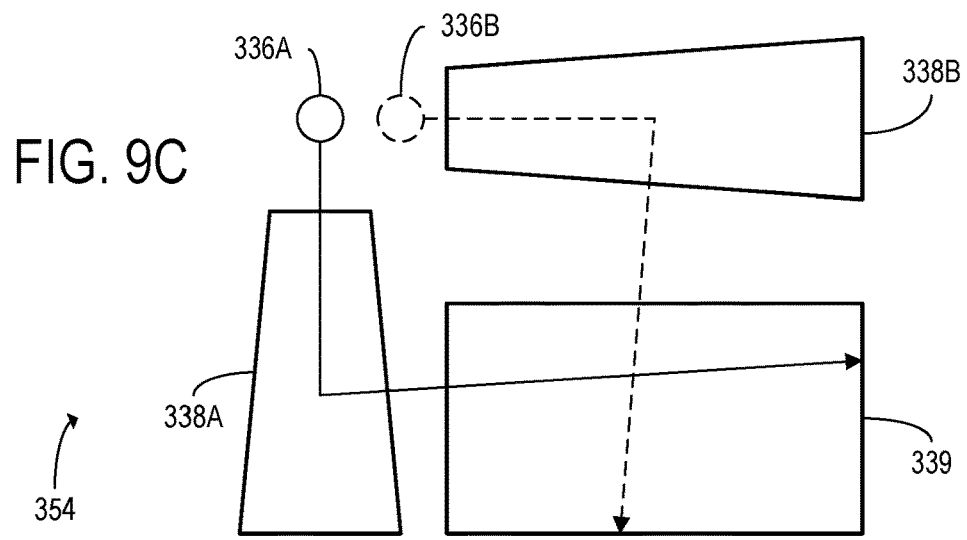
FIG. 9C shows a top view of another example pupil replicated waveguide including a first redirection grating and a second redirection grating, according to the embodiment of FIGS. 8A-8B.

FIG. 9C shows a top view of an alternative configuration of a pupil replicated waveguide 354. The configuration of FIG. 9C includes a first redirection grating 338A and a second redirection grating 338B that may be configured to redirect light that passes through the first input grating 336A and the second input grating 336B respectively. In the embodiment of FIG. 9C, the first redirection grating 338A and the second redirection grating 338B both redirect light to the same extraction grating 339. In other embodiments, the first redirection grating 338A and the second redirection grating 338B may redirect light to separate extraction gratings 339.

Although FIG. 8A shows two illumination sources 312A and 312B and FIGS. 8B-9C show two input gratings 336A and 336B, each pixel 50 of the display 32 may be formed using four illumination sources and four input gratings corresponding to four subpixels 54. In such embodiments, the third and fourth illumination sources may be located in a direction orthogonal to the page relative to the first illumination source 312A and the second illumination source 312B of FIG. 8A, thus forming a rectangle of illumination sources. A plurality of these rectangular pixels 50 may be arranged in a rectangular grid, as shown in FIGS. 6A-6D. Similarly, the input gratings included in the pupil replicated waveguide 334 may be arranged in a rectangular grid to form pixels 50 that each have four corresponding input gratings.

Figure 10A:
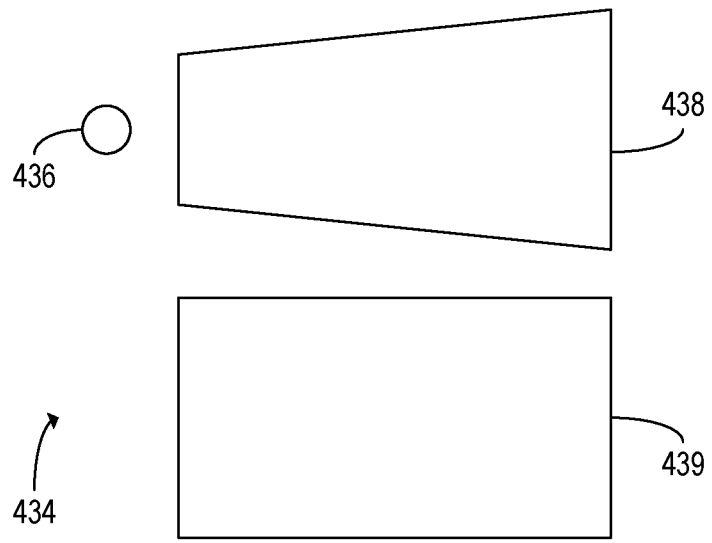
FIG. 10A shows a top view of an example waveguide having a single entrance pupil, according to the embodiment of FIG. 1.
Figure 10B:
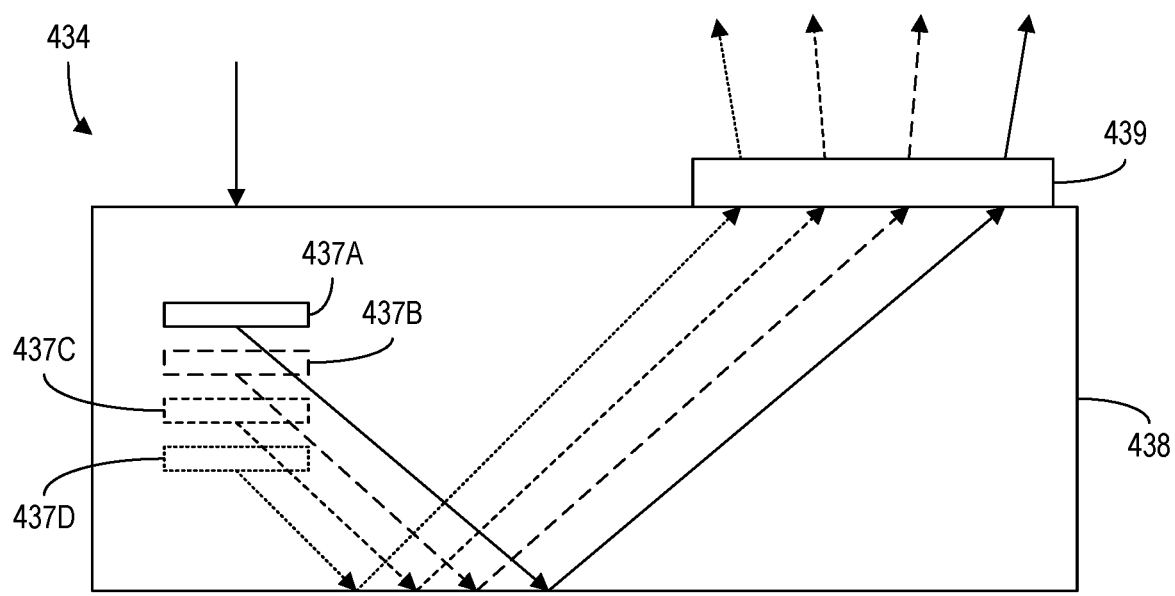
FIG. 10B shows a cross-sectional view of the example waveguide of FIG. 10A including a plurality of embedded gratings.

FIGS. 10A-10B show another example embodiment of a pupil replicated waveguide 434, which is shown in a top view in FIG. 10A and a cross-sectional view in FIG. 10B. The pupil replicated waveguide 434 may include an input pupil 436, a redirection grating 438, and an extraction grating 439. In contrast to the embodiments of FIGS. 8A-9B and FIG. 9C, the redirection grating 438 includes a plurality of embedded gratings. FIG. 10B shows a first embedded grating 437A, a second embedded grating 437B, a third embedded grating 437C, and a fourth embedded grating 437D that are stacked within the redirection grating 438 below the input pupil 436. The first embedded grating 437A, the second embedded grating 437B, the third embedded grating 437C, and the fourth embedded grating 437D may have respective coupling angles that are different from each other, such that each of the embedded gratings 437A, 437B, 437C, and 437D corresponds to a different subpixel location. These different coupling angles are illustrated in FIG. 10B by the divergent paths of emitted light emitted from extraction grating 439.

Each of the embedded gratings 437A, 437B, 437C, and 437D may be configured to be activated and deactivated electronically. The embedded gratings 437A, 437B, 437C, and 437D may each be configured to refract incoming light when activated and transmit incoming light without refracting it when not activated. Accordingly, the wobulation circuit 38 may configured to apply the wobulation to the reprojected rendered image 64 by activating and deactivating the embedded gratings 437A, 437B, 437C, and 437D to apply respective spatial offsets 78 to the plurality of pixels 50. In some embodiments, for each pixel 50, the wobulation circuit 38 may be configured to activate at most one of the embedded gratings 437A, 437B, 437C, or 437D at any given wobulated pixel subframe 72. In other embodiments, an embedded grating of the plurality of embedded gratings 437A, 437B, 437C, and 437D may remain activated while one or more of the other embedded gratings are active.

As an alternative to the including a plurality of embedded gratings in the redirection grating of a single pupil replicated waveguide 434, the projector 300 may instead include a plurality of spatially multiplexed pupil replicated waveguides that include respective input gratings configured to be activated and deactivated electronically, such that each input grating is configured to refract incoming light when activated and transmit incoming light without refraction when deactivated. Each of these spatially multiplexed pupil replicated waveguides may include one or more input gratings. Electronic activation and deactivation of the input gratings may thereby allow for temporal multiplexing of the input gratings as well as spatial multiplexing. In such embodiments, the spatial offsets 78 of the subpixels 54 may be applied by addressing the input gratings as indicated by the sequence 70 of wobulated pixel subframes 72.

In some embodiments, image foveation may be applied to the reprojected rendered image 64 along with wobulation. In such embodiments, the subpixel information 76 of the pixels 50 in the wobulated pixel subframes 72 may include respective spatial offsets 78 of more than one subpixel 54. Each of these spatial offsets 78 may be vertical, horizontal, or both vertical and horizontal. As some specific examples, the subpixels 54 in a wobulated pixel subframe 72 may be spatially offset by a distance of 50 pixels 50 and one subpixel 54, 100 pixels 50 and one subpixel 54, or 200 pixels 50 and one subpixel 54. Offsets of other pixel dimensions are also contemplated. Using these spatial offsets 78 by distances larger than one subpixel 54, field of view (FOV) stitching may be performed, in which different areas of the reprojected rendered image 64 are displayed in different wobulated pixel subframes 72.

Figure 11:
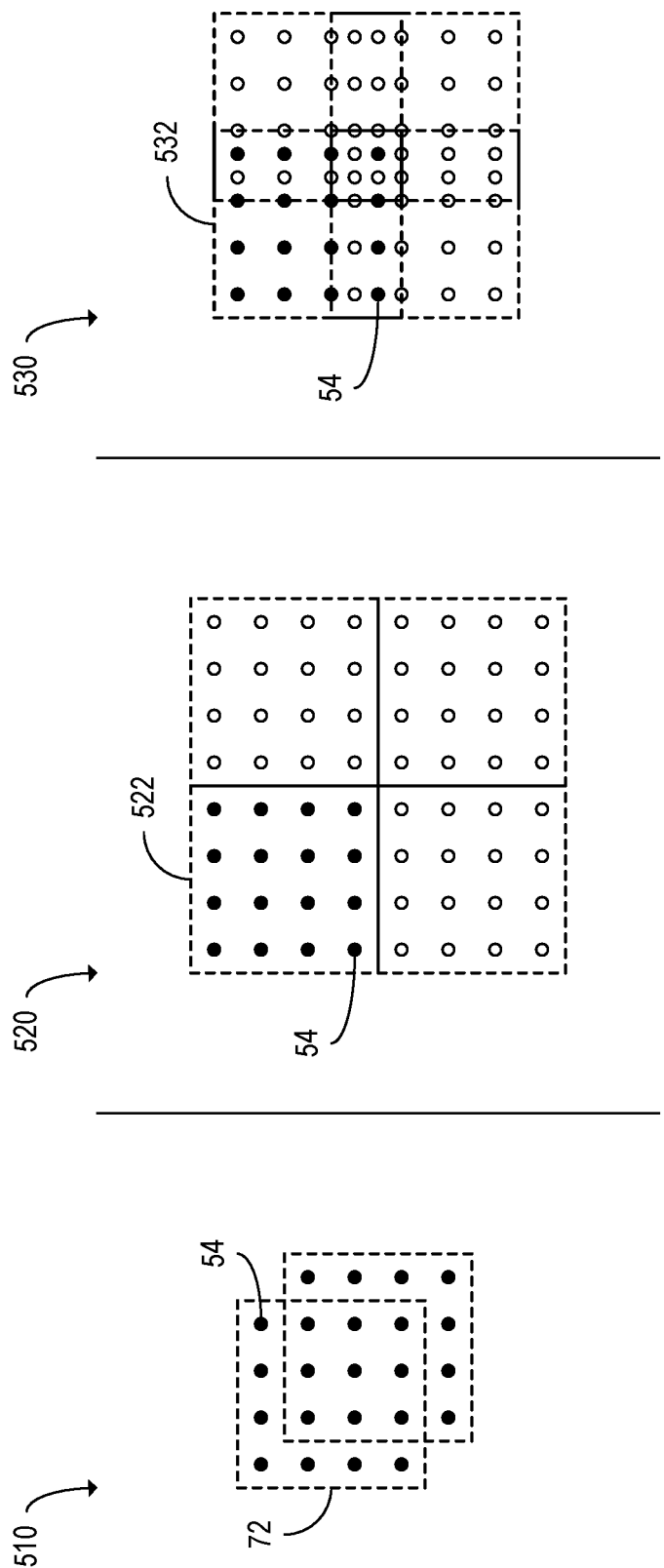
FIG. 11 shows examples of a first pixel layout in which wobulation is performed without field-of-view (FOV) stitching, a second pixel layout in which FOV stitching is performed without wobulation, and a third pixel layout in which both wobulation and FOV stitching are performed, according to the embodiment of FIG. 1.

FIG. 11 shows examples of a first pixel layout 510 in which wobulation is performed without FOV stitching, a second pixel layout 520 in which FOV stitching is performed without wobulation, and a third pixel layout 530 in which both wobulation and FOV stitching are performed. In the first pixel layout 510, a spatial offset 78 one subpixel 54 downward and one subpixel 54 to the right is shown between two wobulated pixel subframes 72, as in the example of FIGS. 6A-6D.

The second pixel layout 520 shows four FOV regions 522 that may be spatially and/or temporally multiplexed. The subpixels 54 included in the currently displayed FOV region 522 are shown filled-in in the second pixel layout 520, while the subpixels 54 of the FOV regions 522 displayed at other times are shown as outlines. The FOV regions 522 are non-overlapping in the example of FIG. 11. In embodiments in which the FOV regions 522 are spatially multiplexed, the FOV regions 522 may be projected to the user's eye 340 through separate pupil replicated waveguides. In embodiments in which the FOV regions 522 are temporally multiplexed, the different FOV regions 522 may be displayed in separate subframes. When the display 32 of the head-mounted display device 10 includes the pupil replicated waveguide 334 of FIGS. 8A-9B, the pupil replicated waveguide 354 of FIG. 9C, or the pupil replicated waveguide 434 of FIGS. 10A-10B, FOV stitching may be performed by applying an angular displacement to the light leaving the extraction grating of the pupil replicated waveguide. Although four FOV regions 522 are displayed in the example of FIG. 11, other numbers of FOV regions 522 may be used in other embodiments.

The third pixel layout 530 shown in FIG. 11 includes four wobulated FOV regions 532 that may be displayed in separate wobulated pixel subframes 72. The four wobulated FOV regions 532 shown in the third pixel layout 530 overlap such that a subpixel density of the third pixel layout is higher near the center than at the edges. This increase in density near the center of the third pixel layout 530 may provide increased resolution near the fovea at the center of the user's retina, where the perceptual clarity of the user's vision is higher than at the periphery of the user's vision. The location of the fovea may be determined via gaze tracking using image data collected by the inward-facing optical sensor 24. Thus, the current frame generated from the reprojected rendered image 64 may be displayed with a nonuniform subpixel density that appears to be clearer without increasing the number of subpixels 54 that are included in the current frame.

Similarly to the FOV regions 522 in the second pixel layout 520, the wobulated FOV regions 532 may be spatially and/or temporally multiplexed. In embodiments in which the wobulated FOV regions 532 are spatially multiplexed, the wobulated FOV regions 532 may be output to the user's eye 340 by separate pupil replicated waveguides. In such embodiments, wobulation may be performed at each of the pupil replicated waveguides.

The separate pupil replicated waveguides of the wobulated FOV regions 532 may have different angular bandwidths over which light may be emitted from their respective output gratings. By using separate angular bandwidths for the pupil replicated waveguides, the coupling efficiencies of the pupil replicated waveguides may be increased due to the extraction gratings emitting light over smaller ranges of angles. In addition, each wobulated FOV region 532 may be illuminated more uniformly when the pupil replicated waveguides have different angular bandwidths.

Using the systems and methods discussed above, the size and power consumption of a near-eye display included in a head-mounted display device may be reduced. Applying wobulation to the reprojected rendered image may allow the apparent resolution of the display perceived by the user to be increased, e.g. by a factor of four. In addition, superresolution may be achieved both by performing late-stage reprojection on a rendered image and by applying wobulation to the reprojected rendered image, thereby allowing for further increases in perceived resolution. Thus, the techniques discussed above may allow a smaller, less energy-intensive projector to be used without the user perceiving a decrease in display resolution. Savings in size may also be achieved using the in-panel wobulation techniques discussed above rather than including an external wobbulator in the head-mounted display device.

In some embodiments, the methods and processes described herein may be tied to a computing system of one or more computing devices. In particular, such methods and processes may be implemented as a computer-application program or service, an application-programming interface (API), a library, and/or other computer-program product.

Figure 12:
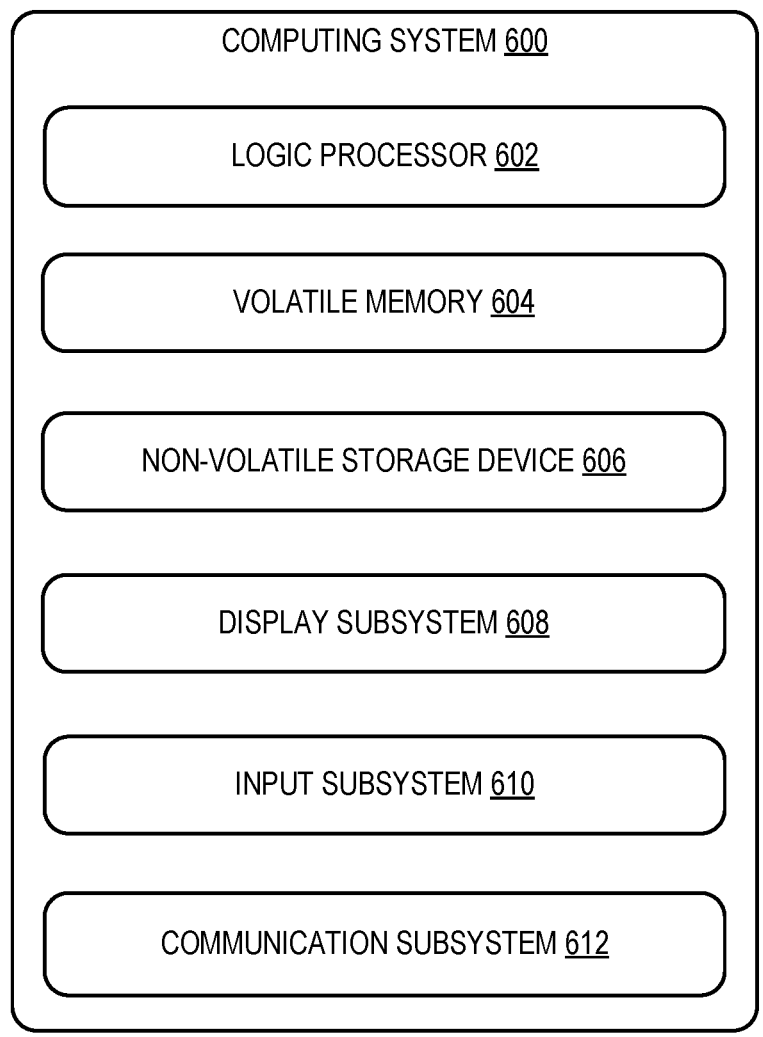
FIG. 12 shows a schematic view of an example computing environment in which the head-mounted display device and the remote computing device of FIG. 1 may be included.

FIG. 12 schematically shows a non-limiting embodiment of a computing system 600 that can enact one or more of the methods and processes described above. Computing system 600 is shown in simplified form. Computing system 600 may embody the head-mounted display device 10 and the remote computing device 80 described above and illustrated in FIG. 1. Computing system 600 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 600 includes a logic processor 602 volatile memory 604, and a non-volatile storage device 606. Computing system 600 may optionally include a display subsystem 608, input subsystem 610, communication subsystem 612, and/or other components not shown in FIG. 12.

Logic processor 602 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 606 includes one or more physical devices configured to hold instructions executable by the logic processors to implement the methods and processes described herein. When such methods and processes are implemented, the state of non-volatile storage device 606 may be transformed—e.g., to hold different data.

Non-volatile storage device 606 may include physical devices that are removable and/or built-in. Non-volatile storage device 606 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 606 may include nonvolatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Volatile memory 604 may include physical devices that include random access memory. Volatile memory 604 is typically utilized by logic processor 602 to temporarily store information during processing of software instructions. It will be appreciated that volatile memory 604 typically does not continue to store instructions when power is cut to the volatile memory 604.

Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 608 may be used to present a visual representation of data held by non-volatile storage device 606. The visual representation may take the form of a graphical user interface (GUI). As the herein described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices.

When included, input subsystem 610 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 600 to send and/or receive messages to and/or from other devices via a network such as the Internet.

The following paragraphs describe several aspects of the present disclosure. A head-mounted display device is provided, including one or more position sensors and a processor. The processor may be configured to receive a rendered image of a current frame that has been rendered at a remote computing device. The processor may be further configured to receive position data from the one or more position sensors. The processor may be further configured to determine an updated device pose of the head-mounted display device based on the position data. The processor may be further configured to apply a first spatial correction to color information in pixels of the rendered image at least in part by reprojecting the rendered image based on the updated device pose. The head-mounted display device may further include a display configured to apply a second spatial correction to the color information in the pixels of the reprojected rendered image at least in part by applying wobulation to the reprojected rendered image to thereby generate a sequence of wobulated pixel subframes for the current frame. The display may be further configured to display the current frame by displaying the sequence of wobulated pixel subframes.

According to this aspect, the wobulation may be applied to the reprojected rendered image at a wobulation circuit included in the display.

According to this aspect, the display may include a plurality of pixels that each include a respective plurality of addressable subpixels. The wobulation circuit may be configured to apply the wobulation to the reprojected rendered image at least in part by readdressing one or more subpixels of each of the plurality of pixels.

According to this aspect, each wobulated pixel subframe may have a corresponding subpixel color and a corresponding spatial offset.

According to this aspect, the sequence of wobulated pixel subframes may include one or more red wobulated pixel subframes, one or more green wobulated pixel subframes, and one or more blue wobulated pixel subframes. A number of the one or more red wobulated pixel subframes, a number of the one or more green wobulated pixel subframes, and a number of the one or more blue wobulated pixel subframes included in the sequence may be not all equal to each other.

According to this aspect, the corresponding spatial offset of each wobulated pixel subframe may be a vertical offset by one subpixel, a horizontal offset by one subpixel, or a vertical offset by one subpixel and a horizontal offset by one subpixel.

According to this aspect, the subpixels of the current frame may be displayed with a nonuniform subpixel density.

According to this aspect, the display may be a liquid crystal on silicon (LCoS) display.

According to this aspect, the rendered image may be rendered at the remote computing device according to a render-time estimate of an estimated device pose of the head-mounted display device at a display time of the current frame.

According to this aspect, the display may further include a pupil replicated waveguide having a first entrance port with a first coupling angle and a second entrance port with a second coupling angle. The first coupling angle may be different from the second coupling angle.

According to another aspect of the present disclosure, a method for use with a head-mounted display device is provided. The method may include, at a processor, receiving a rendered image of a current frame that has been rendered at a remote computing device. The method may further include, at the processor, receiving position data from one or more position sensors. The method may further include, at the processor, determining an updated device pose of the head-mounted display device based on the position data. The method may further include, at the processor, applying a first spatial correction to color information in pixels of the rendered image at least in part by reprojecting the rendered image based on the updated device pose. The method may further include, at a display, applying a second spatial correction to the color information in the pixels of the reprojected rendered image at least in part by applying wobulation to the reprojected rendered image to thereby generate a sequence of wobulated pixel subframes for the current frame. The method may further include, at the display, displaying the current frame by displaying the sequence of wobulated pixel subframes.

According to this aspect, the wobulation may be applied to the reprojected rendered image at a wobulation circuit included in the display.

According to this aspect, the display may include a plurality of pixels that each include a respective plurality of addressable subpixels. Applying wobulation to the reprojected rendered image may include readdressing one or more subpixels of each of the plurality of pixels.

According to this aspect, each wobulated pixel subframe may have a corresponding subpixel color and a corresponding spatial offset.

According to this aspect, the sequence of wobulated pixel subframes may include one or more red wobulated pixel subframes, one or more green wobulated pixel subframes, and one or more blue wobulated pixel subframes. A number of the one or more red wobulated pixel subframes, a number of the one or more green wobulated pixel subframes, and a number of the one or more blue wobulated pixel subframes included in the sequence may be not all equal to each other.

According to this aspect, the corresponding spatial offset of each wobulated pixel subframe may be a vertical offset by one subpixel, a horizontal offset by one subpixel, or a vertical offset by one subpixel and a horizontal offset by one subpixel.

According to this aspect, the rendered image may be rendered at the remote computing device according to a render-time estimate of an estimated device pose of the head-mounted display device at a display time of the current frame.

According to another aspect of the present disclosure, a head-mounted display device is provided, including one or more position sensors. The head-mounted display device may further include a liquid crystal on silicon (LCoS) display including a plurality of pixels that each include a respective plurality of addressable subpixels. The head-mounted display device may further include a processor configured to receive a rendered image of a current frame that has been rendered at a remote computing device. The processor may be further configured to receive position data from the one or more position sensors. The processor may be further configured to determine an updated device pose of the head-mounted display device based on the position data. The processor may be further configured to apply a first spatial correction to color information in pixels of the rendered image at least in part by reprojecting the rendered image based on the updated device pose. The LCoS display may be configured to, at a wobulation circuit, apply a second spatial correction to the color information in the pixels of the reprojected rendered image at least in part by readdressing one or more subpixels of the reprojected rendered image to thereby generate a sequence of wobulated pixel subframes for the current frame. The LCoS display may be further configured to display the current frame by displaying the sequence of wobulated pixel subframes.

According to this aspect, each wobulated pixel subframe may have a corresponding subpixel color selected from the group consisting of red, green, and blue. Each wobulated pixel subframe may have a corresponding spatial offset. Each spatial offset may be a vertical offset by one subpixel, a horizontal offset by one subpixel, or a vertical offset by one subpixel and a horizontal offset by one subpixel.

According to this aspect, the display may further include a pupil replicated waveguide having a first entrance port with a first coupling angle and a second entrance port with a second coupling angle. The first coupling angle may be different from the second coupling angle.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A head-mounted display device comprising:
one or more position sensors;
a processor configured to:
receive a rendered image of a current frame that has been rendered at a remote computing device;
receive position data from the one or more position sensors;
determine an updated device pose of the head-mounted display device based on the position data; and
apply a first spatial correction to color information in pixels of the rendered image at least in part by reprojecting the rendered image based on the updated device pose; and
a display that includes a plurality of pixels that each include a respective plurality of addressable subpixels, wherein the display is configured to:
generate a plurality of field-of-view (FOV) regions of the reprojected rendered image, wherein generating the plurality of FOV regions includes applying a spatial offset by two or more subpixels in at least a first direction to a region of the reprojected rendered image; and
display the current frame by displaying the plurality of FOV regions in a spatially or temporally multiplexed manner.

2. The head-mounted display device of claim 1, wherein:
the display is further configured to apply a second spatial correction to the color information in the pixels of the reprojected rendered image at least in part by applying wobulation to the FOV regions of the reprojected rendered image to thereby generate a sequence of wobulated pixel subframes for the current frame; and
displaying the current frame includes displaying the sequence of wobulated pixel subframes.

3. The head-mounted display device of claim 2, wherein applying the wobulation to the reprojected rendered image includes readdressing one or more subpixels of each of the plurality of pixels.

4. The head-mounted display device of claim 3, wherein:
each wobulated pixel subframe has a corresponding subpixel color and a corresponding spatial offset; and
the corresponding spatial offset of each wobulated pixel subframe is a vertical offset by one subpixel, a horizontal offset by one subpixel, or a vertical offset by one subpixel and a horizontal offset by one subpixel.

5. The head-mounted display device of claim 1, wherein generating the plurality of FOV regions includes applying a respective plurality of different spatial offsets to the region of the reprojected rendered image.

6. The head-mounted display device of claim 1, wherein:
the plurality of FOV regions are displayed in a spatially multiplexed manner; and
the plurality of FOV regions are displayed via a corresponding plurality of pupil replicated waveguides.

7. The head-mounted display device of claim 1, wherein:
the plurality of FOV regions are displayed in a temporally multiplexed manner; and
the plurality of FOV regions are displayed in different respective subframes included in the current frame.

8. The head-mounted display device of claim 1, wherein the subpixels of the current frame are displayed with a nonuniform subpixel density.

9. The head-mounted display device of claim 8, further comprising an inward-facing optical sensor, wherein:
the processor is further configured to:
receive image data collected by the inward-facing optical sensor;
perform gaze tracking based at least in part on the image data to determine an estimated location of a fovea of the user; and
compute the nonuniform subpixel density such that a subpixel density at the estimated location of the fovea of the user is higher than a subpixel density outside the estimated location of the fovea of the user; and
the display is further configured to display the current frame with the nonuniform subpixel density computed at the processor.

10. The head-mounted display device of claim 1, wherein the spatial offset is an offset by two or more subpixels in the first direction and two or more subpixels in a second direction.

11. A method for use with a head-mounted display device, the method comprising:
at a processor:
receiving a rendered image of a current frame that has been rendered at a remote computing device;
receiving position data from one or more position sensors;
determining an updated device pose of the head-mounted display device based on the position data; and
applying a first spatial correction to color information in pixels of the rendered image at least in part by reprojecting the rendered image based on the updated device pose; and
at a display that includes a plurality of pixels that each include a respective plurality of addressable subpixels:
generating a plurality of field-of-view (FOV) regions of the reprojected rendered image, wherein generating the plurality of FOV regions includes applying a spatial offset by two or more subpixels in at least a first direction to a region of the reprojected rendered image; and
displaying the current frame by displaying the plurality of FOV regions in a spatially or temporally multiplexed manner.

12. The method of claim 11, further comprising, at the display, applying a second spatial correction to the color information in the pixels of the reprojected rendered image at least in part by applying wobulation to the FOV regions of the reprojected rendered image to thereby generate a sequence of wobulated pixel subframes for the current frame, wherein displaying the current frame includes displaying the sequence of wobulated pixel subframes.

13. The method of claim 12, wherein applying the wobulation to the reprojected rendered image includes readdressing one or more subpixels of each of the plurality of pixels.

14. The method of claim 13, wherein:
each wobulated pixel subframe has a corresponding subpixel color and a corresponding spatial offset; and
the corresponding spatial offset of each wobulated pixel subframe is a vertical offset by one subpixel, a horizontal offset by one subpixel, or a vertical offset by one subpixel and a horizontal offset by one subpixel.

15. The method of claim 11, wherein generating the plurality of FOV regions includes applying a respective plurality of different spatial offsets to the region of the reprojected rendered image.

16. The method of claim 11, wherein:
the plurality of FOV regions are displayed in a spatially multiplexed manner; and
the plurality of FOV regions are displayed via a corresponding plurality of pupil replicated waveguides.

17. The method of claim 11, wherein:
the plurality of FOV regions are displayed in a temporally multiplexed manner; and
the plurality of FOV regions are displayed in different respective subframes included in the current frame.

18. The method of claim 11, wherein the subpixels of the current frame are displayed with a nonuniform subpixel density.

19. The method of claim 18, wherein:
the head-mounted display device further includes an inward-facing optical sensor; and
the method further comprises:
receiving image data collected by the inward-facing optical sensor;
performing gaze tracking based at least in part on the image data to determine an estimated location of a fovea of the user; and
computing the nonuniform subpixel density such that a subpixel density at the estimated location of the fovea of the user is higher than a subpixel density outside the estimated location of the fovea of the user; and
displaying the current frame with the nonuniform subpixel density.

20. A head-mounted display device comprising:
one or more position sensors;
an inward-facing optical sensor;
a display that includes a plurality of pixels that each include a respective plurality of addressable subpixels; and
a processor configured to:
receive a rendered image of a current frame that has been rendered at a remote computing device;
receive position data from the one or more position sensors;
determine an updated device pose of the head-mounted display device based on the position data; and
apply a first spatial correction to color information in pixels of the rendered image at least in part by reprojecting the rendered image based on the updated device pose;
receive image data collected by the inward-facing optical sensor;

perform gaze tracking based at least in part on the image data to determine an estimated location of a fovea of the user; and compute a nonuniform subpixel density such that a subpixel density at the estimated location of the fovea of the user is higher than a subpixel density outside the estimated location of the fovea of the user, wherein the display is configured to:

based at least in part on the nonuniform subpixel density computed at the processor, generate a plurality of field-of-view (FOV) regions of the reprojected rendered image, wherein generating the plurality of FOV regions includes applying a spatial offset by two or more subpixels in at least a first direction to a region of the reprojected rendered image;

apply a second spatial correction to the color information in the pixels of the reprojected rendered image at least in part by applying wobulation to the FOV regions of the reprojected rendered image to thereby generate a sequence of wobulated pixel subframes for the current frame; and display the current frame by displaying the sequence of wobulated pixel subframes with the nonuniform subpixel density in a spatially or temporally multiplexed manner.

* * * * *